US011327026B1

(12) United States Patent
Castoro et al.

(10) Patent No.: US 11,327,026 B1
(45) Date of Patent: May 10, 2022

(54) COMPARING GEMSTONE SIGNATURES USING ANGULAR SPECTRUM INFORMATION

(71) Applicant: The RealReal, Inc., San Francisco, CA (US)

(72) Inventors: Loretta Catherine Castoro, Burlingame, CA (US); Meghan Elizabeth Ryterski, Tucson, AZ (US); Matthew Bryan Heger, Tucson, AZ (US); Ludovico Borghi, Tucson, AZ (US); Emily Elizabeth Calara English, Tucson, AZ (US); Chengyu Zhu, Tucson, AZ (US); Jose Sasian, Tucson, AZ (US)

(73) Assignee: The RealReal, Inc., San Francisco, CA (US)

( * ) Notice: Subject to any disclaimer, the term of this patent is extended or adjusted under 35 U.S.C. 154(b) by 0 days.

(21) Appl. No.: 16/398,214

(22) Filed: Apr. 29, 2019

(51) Int. Cl.
*G01N 21/87* (2006.01)
*G01N 21/27* (2006.01)
*G01N 21/47* (2006.01)

(52) U.S. Cl.
CPC ............. *G01N 21/87* (2013.01); *G01N 21/27* (2013.01); *G01N 21/47* (2013.01); *G01N 2021/4704* (2013.01); *G01N 2201/062* (2013.01)

(58) Field of Classification Search
CPC .................................................... G01N 21/87
See application file for complete search history.

(56) References Cited

U.S. PATENT DOCUMENTS

| 7,336,347 B2 * | 2/2008 | Sasian ................... G01N 21/87 356/30 |
| 7,355,683 B2 | 4/2008 | Sasian et al. ................... 356/30 |
| 7,372,552 B2 | 5/2008 | Sasian et al. ................... 356/30 |

(Continued)

OTHER PUBLICATIONS

Jose Sasian, Jason Quick, Jacob Sheffield, James Caudill, and Peter Yantzer, "Evaluation Of Brilliance, Fire, And Scintillation In Round Brilliant Gemstones", Optical Engineering, vol. 46(9), Sep. 2007 (25 pages).

*Primary Examiner* — Shawn Decenzo
(74) *Attorney, Agent, or Firm* — Adibi IP Group, PC; Amir V. Adibi; Andrew C. Palmer

(57) ABSTRACT

A system comprises a faceted structure imaging assembly and a faceted structure image analyzer. Signature information of the gemstone is obtained and compared to stored signature information. The signature information includes angular spectrum information generated by the imaging assembly while a colored light pattern is reflected onto the gemstone. The signature information uniquely identifies the gemstone and indicates whether an entity was the source of the gemstone. The signature information comparison involves comparing an angular spectrum image obtained by the imaging assembly to stored angular spectrum images. In one example, the system compares the obtained signature information to stored signature information to validate a source of the gemstone. In another example, the system obtains signature information of the gemstone and forwards the signature information to a remote validation system. The remote validation system compares the signature information to stored signature information and forwards a validation result to the system.

20 Claims, 43 Drawing Sheets

(56) References Cited

U.S. PATENT DOCUMENTS

| | | | |
|---|---|---|---|
| 7,382,445 B2 | 6/2008 | Sasian et al. | 356/30 |
| 7,420,657 B2 | 9/2008 | Sasian et al. | 356/30 |
| 7,751,034 B2 | 7/2010 | Sasian et al. | 356/30 |
| 8,098,369 B2 | 1/2012 | Sasian et al. | 356/30 |
| 9,599,570 B2 | 3/2017 | Quick | |
| 2005/0190356 A1* | 9/2005 | Sasian | G01N 21/01 356/30 |
| 2010/0085635 A1* | 4/2010 | Verboven | G01N 21/87 359/382 |
| 2013/0016210 A1* | 1/2013 | Smith | G01N 33/381 348/135 |
| 2013/0329212 A1* | 12/2013 | High | G06F 3/0484 356/30 |
| 2016/0161421 A1* | 6/2016 | Eder | G01N 21/87 356/30 |
| 2017/0153215 A1* | 6/2017 | Janoff | C09D 11/50 |
| 2017/0241913 A1* | 8/2017 | Gu | G01N 21/87 |
| 2017/0276612 A1* | 9/2017 | Gaywala | G06K 19/06028 |
| 2017/0307537 A1* | 10/2017 | Yeung | G01N 21/87 |
| 2018/0156735 A1* | 6/2018 | Fitch | G01N 21/25 |
| 2018/0300546 A1* | 10/2018 | Schaefer | G06K 9/00577 |
| 2019/0187063 A1* | 6/2019 | Grof | G01N 33/381 |
| 2019/0251347 A1* | 8/2019 | Timpone | G06Q 30/018 |
| 2020/0050834 A1* | 2/2020 | Niskanen | G01N 21/87 |

* cited by examiner

FACETED STRUCTURE IN A MOUNTED SETTING

EXPANDED VIEW OF STANDARD ROUND BRILLIANT GEMSTONE

STANDARD ROUND BRILLIANT GEMSTONE GEOMETRY

WEIGHT ESTIMATION EQUATION

FACETED STRUCTURE ANALYSIS SYSTEM
(IMAGE SENSOR SLID UPWARDS FOR PLACEMENT OF CYLINDER)

ESTIMATING WEIGHT OF MOUNTED FACETED STRUCTURES

OBTAINING AT LEAST ONE DIMENSION FROM THE FIRST IMAGE

EXAMPLE OF LIGHT RAY ENTERING GEMSTONE FROM LOW ANGLE RANGE

EXAMPLE OF LIGHT RAY ENTERING GEMSTONE FROM MEDIUM ANGLE RANGE

EXAMPLE OF LIGHT RAY ENTERING GEMSTONE FROM HIGH ANGLE RANGE

ANGULAR SPECTRUM IMAGE
(OBTAINED BY IMAGE SENSOR OR
GENERATED DIGITALLY)
96
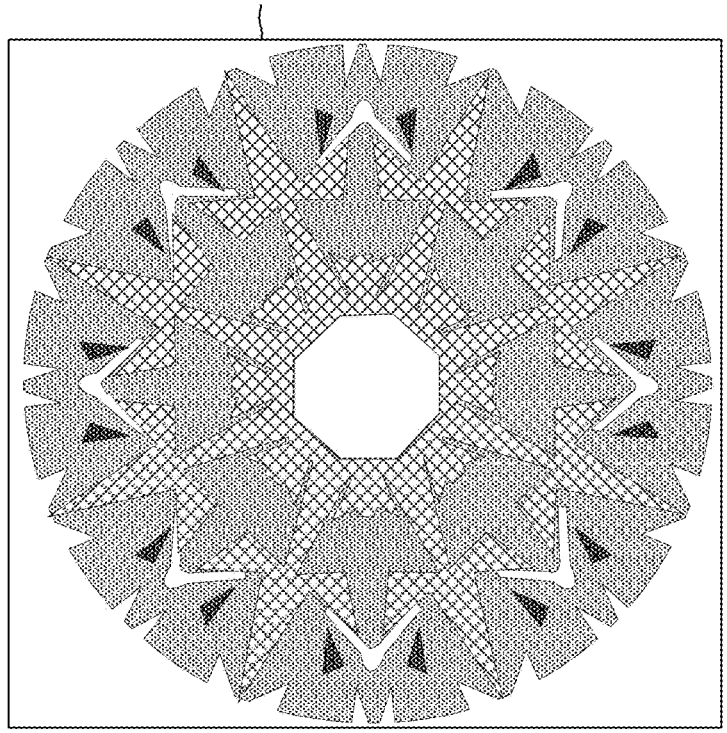
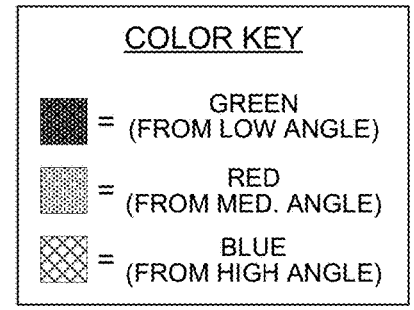
ANGULAR SPECTRUM IMAGE OF A GEMSTONE
(ASET IMAGE)
FIG. 23

EXPLODED VIEW OF FACETED STRUCTURE IMAGING ASSEMBLY

FACETED STRUCTURE IMAGE ANALYZER

GENERATING COLOR BIN FOR AN ANGULAR SPECTRUM IMAGE OF A FACETED STRUCTURE

135

POSSIBLE RGB VALUES BETWEEN 0-255

|   | 0 | 1 | 2 | 3 | ••• | 252 | 253 | 254 | 255 |
|---|---|---|---|---|-----|-----|-----|-----|-----|
| RED | 0 | 0 | 0 | 0 | ••• | 0 | 0 | 0 | 0 |
| GREEN | 0 | 0 | 0 | 0 | ••• | 0 | 0 | 0 | 0 |
| BLUE | 0 | 0 | 0 | 0 | ••• | 0 | 0 | 0 | 0 |

INITIALIZE COLOR BIN

FIG. 29

COLOR BIN OF CAPTURED IMAGE 136

|   | 0 | 1 | 2 | 3 | ••• | 252 | 253 | 254 | 255 |
|---|---|---|---|---|-----|-----|-----|-----|-----|
| RED | $r_0$ | $r_1$ | $r_2$ | $r_3$ | ••• | $r_{252}$ | $r_{253}$ | $r_{254}$ | $r_{255}$ |
| GREEN | $g_0$ | $g_1$ | $g_2$ | $g_3$ | ••• | $g_{252}$ | $g_{253}$ | $g_{254}$ | $g_{255}$ |
| BLUE | $b_0$ | $b_1$ | $b_2$ | $b_3$ | ••• | $b_{252}$ | $b_{253}$ | $b_{254}$ | $b_{255}$ |

GENERATE COLOR BIN OF OBTAINED ANGULAR SPECTRUM IMAGE

FIG. 30

REFERENCE COLOR BINS 137                                                  138

|   | 0 | 1 | ••• | 255 |   | 0 | 1 | ••• | 255 |
|---|---|---|-----|-----|---|---|---|-----|-----|
| RED | $R1\_r_0$ | $R1\_r_1$ | ••• | $R1\_r_{255}$ | ••• | $R616\_r_0$ | $R616\_r_1$ | ••• | $R616\_r_{255}$ |
| GREEN | $R1\_g_0$ | $R1\_g_1$ | ••• | $R1\_g_{255}$ |   | $R616\_g_0$ | $R616\_g_1$ | ••• | $R616\_g_{255}$ |
| BLUE | $R1\_b_0$ | $R1\_b_1$ | ••• | $R1\_b_{255}$ |   | $R616\_b_0$ | $R616\_b_1$ | ••• | $R616\_b_{255}$ |

GENERATE COLOR BIN OF EACH OF THE REFERENCE ANGULAR SPECTRUM IMAGES

FIG. 31

$$SAD_{R1} = |r_0 - R1_{r0}| + |r_1 - R1_{r1}| + \cdots + |g_0 - R1_{g0}| + |g_1 - R1_{g1}| + \cdots + |b_0 - R1_{b0}| + |b_1 - R1_{b1}|$$

$$SAD_{R2} = |r_0 - R2_{r0}| + |r_1 - R2_{r1}| + \cdots + |g_0 - R2_{g0}| + |g_1 - R2_{g1}| + \cdots + |b_0 - R2_{b0}| + |b_1 - R2_{b1}|$$

$$\vdots$$

$$SAD_{R616} = |r_0 - R616_{r0}| + |r_1 - R616_{r1}| + \cdots + |g_0 - R616_{g0}| + |g_1 - R616_{g1}| + \cdots + |b_0 - R616_{b0}| + |b_1 - R616_{b1}|$$

PERFORM SUM OF ABSOLUTE DIFFERENCE (SAD) OPERATION FOR EACH REFERENCE IMAGE

FIG. 32

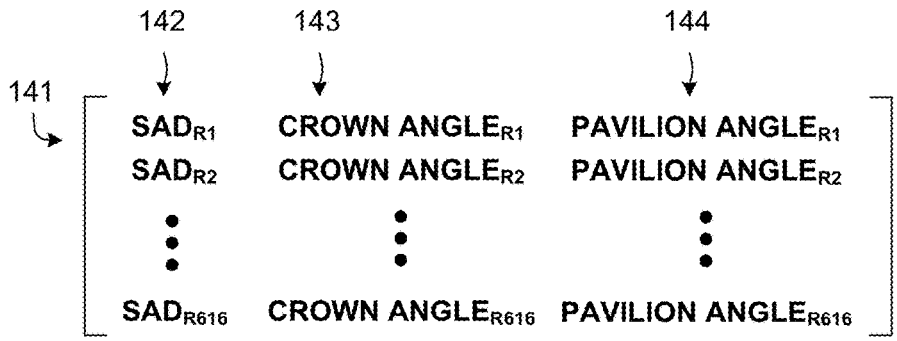

MATRIX OF SAD VALUES WITH CORRESPONDING CROWN AND PAVILION ANGLES

FIG. 33

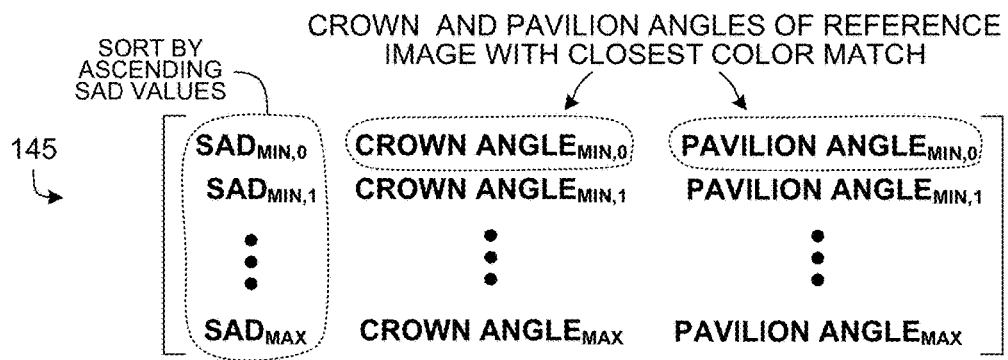

SORTED MATRIX OF SAD VALUES WITH CORRESPONDING CROWN AND PAVILION ANGLES

FIG. 34

ESTIMATE CROWN AND PAVILION ANGLE BY AVERAGING ANGLES IN SORTED MATRIX OF SAD VALUES

```
FUNCTION [AVGMAXCA, AVGMAXPA] = COLORBINCOMPARISON(IMAGE)          148

STARTCA = 20.00; %STARTING PAVILION ANGLE
STARTPA = 37.50; %STARTING CROWN ANGLE

REF = IMREAD(IMAGE);   %REFERENCE IMAGE

DATA = ZEROS(3,616);
TEMPINDEX = 1;

RREFBIN = 1:257;
BREFBIN = 1:257;
GREFBIN = 1:257;

RREF = REF(:,:,1);
   FOR X = 1:1000
      FOR Y = 1:1000
         RREFBIN(RREF(X,Y) + 1) = RREFBIN(RREF(X, Y) + 1) + 1;
      END
   END

BREF = REF(:,:,2);
   FOR X = 1:1000
      FOR Y = 1:1000
         BREFBIN(BREF(X,Y) + 1) = BREFBIN(BREF(X, Y) + 1) + 1;
      END
   END

GREF = REF(:,:,3);
   FOR X = 1:1000
      FOR Y = 1:1000
         GREFBIN(GREF(X,Y) + 1) = GREFBIN(GREF(X, Y) + 1) + 1;
      END
   END

SUMRREF = SUM(RREF, 2);
SUMRREF = SUM(SUMRREF);

SUMBREF = SUM(BREF, 2);
SUMBREF = SUM(SUMBREF);

SUMGREF = SUM(GREF, 2);
SUMGREF = SUM(SUMGREF);

FOR I = 0:13  %ADD TO PAVILION ANGLE
   FOR J = 0:43 %ADD TO CROWN ANGLE
      CURRPA = STARTPA + I/2;
      CURRCA = STARTCA + J/2;
```

FIG. 37A

```
    IF (REM(CURRCA, 1) == 0 && REM(CURRPA, 1) ~= 0)
        CURRIMAGE = ['CRO' NUM2STR(CURRCA) '.00PAV' NUM2STR(CURRPA) '0.JPG'];
    ELSEIF(REM(CURRCA, 1) ~= 0 && REM(CURRPA, 1) == 0)
        CURRIMAGE = ['CRO' NUM2STR(CURRCA) '0PAV' NUM2STR(CURRPA) '.00.JPG'];
    ELSEIF(REM(CURRCA, 1) == 0 && REM(CURRPA, 1) == 0)
        CURRIMAGE = ['CRO' NUM2STR(CURRCA) '.00PAV' NUM2STR(CURRPA) '.00.JPG'];
    ELSE
        CURRIMAGE = ['CRO' NUM2STR(CURRCA) '0PAV' NUM2STR(CURRPA) '0.JPG'];
    END
    A = IMREAD(CURRIMAGE);  %IMAGE GENERATED BY THE MATRIX

RABIN = 1:257;
BABIN = 1:257;
GABIN = 1:257;

RA = A(:,:,1);
    FOR X = 1:1000
        FOR Y = 1:1000
            RABIN(RA(X,Y) + 1) = RABIN(RA(X, Y) + 1) + 1;
        END
    END

BA = A(:,:,2);
    FOR X = 1:1000
        FOR Y = 1:1000
            BABIN(BA(X,Y) + 1) = BABIN(BA(X, Y) + 1) + 1;
        END
    END
GA = A(:,:,3);
    FOR X = 1:1000
        FOR Y = 1:1000
            GABIN(GA(X,Y) + 1) = GABIN(GA(X, Y) + 1) + 1;
        END
    END

SAD = ABS(RREFBIN - RABIN) + ABS(BREFBIN - BABIN) + ABS(GREFBIN - GABIN);

DATA(1,TEMPINDEX) = SUM(SAD);
    DATA(2,TEMPINDEX) = CURRCA;
    DATA(3,TEMPINDEX) = CURRPA;

END
END

CORR = DATA(1,:);

[SORTEDX, SORTEDINDS] = SORT(CORR);
```

FIG. 37B

```
MAX5CORR = DATA(1, SORTEDINDS(1:20));
MAX5CA = DATA(2, SORTEDINDS(1:20));
MAX5PA = DATA(3, SORTEDINDS(1:20));

AVGMAXCA = SUM(MAX5CA)/20;
AVGMAXPA = SUM(MAX5PA)/20;
AVGMAXCOR = SUM(MAX5CORR)/20;

FPRINTF('THE AVERAGE MAX CROWN ANGLE IS %2.2F\N', AVGMAXCA);
FPRINTF('THE AVERAGE MAX PAVILION ANGLE IS %2.2F\N', AVGMAXPA);
FPRINTF('THE AVERAGE MAX CORRELATION IS %0.4F\N', AVGMAXCOR);

END
```

KEY TO FIG. 37:

```
FUNCTION WEIGHT = WEIGHTCALCULATIONFUNCTION(T, D, A, B, G)

%A: PAVILION ANGLE (DEGREES)
%B: CROWN ANGLE (DEGREES)
%D: DIAMETER OF STONE (MM)
%T: TABLE SIZE (MM)
%G: GIRDLE WIDTH
%CF: CORRECTION FACTOR TO GET THE WEIGHT IN CARATS
%GT GIRDLE THICKNESS

CF = 0.00619;
  GCF = 1.00; % GIRDLE CORRECTION FACTOR

D1 = 5.37;
  T1 = 3.45;
  D1 = 3.30;

D1 = ((TAND(B)*((D1-T1)/2)) + (TAND(A)*(D1/2)));

%FPRINTF('THE DEPTH IS: %2.2F\N', D);

IF(D >= 3.8 && D <= 4.175)
    IF(STRCMP(G , "ST"))
      GCF = 1.03;
    END
    IF(STRCMP(G ,"TH"))
      GCF = 1.04;
    END
    IF(STRCMP(G , "VT"))
      GCF = 1.09;
    END
    IF(STRCMP(G , "ET"))
      GCF = 1.12;
    END
  END
  IF(D > 4.175 && D <= 4.575)
    IF(STRCMP(G , "ST"))
      GCF = 1.02;
    END
    IF(STRCMP(G ,"TH"))
      GCF = 1.04;
    END
    IF(STRCMP(G , "VT"))
      GCF = 1.08;
    END
    IF(STRCMP(G , "ET"))
      GCF = 1.11;
    END
  END
END
```

FIG. 39A

```
IF(D > 4.575 && D <= 4.675)
   IF(STRCMP(G , "ST"))
      GCF = 1.02;
   END
   IF(STRCMP(G ,"TH"))
      GCF = 1.04;
   END
   IF(STRCMP(G , "VT"))
      GCF = 1.08;
   END
   IF(STRCMP(G , "ET"))
      GCF = 1.10;
   END
END
IF(D > 4.675 && D <= 4.725)
   IF(STRCMP(G , "ST"))
      GCF = 1.02;
   END
   IF(STRCMP(G ,"TH"))
      GCF = 1.03;
   END
   IF(STRCMP(G , "VT"))
      GCF = 1.08;
   END
   IF(STRCMP(G , "ET"))
      GCF = 1.10;
   END
END
IF(D > 4.725 && D <= 5.125)
   IF(STRCMP(G , "ST"))
      GCF = 1.02;
   END
   IF(STRCMP(G ,"TH"))
      GCF = 1.03;
   END
   IF(STRCMP(G , "VT"))
      GCF = 1.07;
   END
   IF(STRCMP(G , "ET"))
      GCF = 1.10;
   END
END
IF(D > 5.125 && D <= 5.525)
   IF(STRCMP(G , "ST"))
      GCF = 1.02;
   END
   IF(STRCMP(G ,"TH"))
      GCF = 1.03;
   END
```

FIG. 39B

```
      IF(STRCMP(G , "VT"))
         GCF = 1.07;
      END
      IF(STRCMP(G , "ET"))
         GCF = 1.09;
      END
   END
   IF(D > 5.525 && D <= 5.775)
      IF(STRCMP(G , "ST"))
         GCF = 1.02;
      END
      IF(STRCMP(G ,"TH"))
         GCF = 1.03;
      END
      IF(STRCMP(G , "VT"))
         GCF = 1.06;
      END
      IF(STRCMP(G , "ET"))
         GCF = 1.09;
      END
   END
   IF(D > 5.775 && D <= 6.575)
      IF(STRCMP(G , "ST"))
         GCF = 1.02;
      END
      IF(STRCMP(G ,"TH"))
         GCF = 1.03;
      END
      IF(STRCMP(G , "VT"))
         GCF = 1.06;
      END
      IF(STRCMP(G , "ET"))
         GCF = 1.08;
      END
   END
   IF(D > 6.575 && D <= 6.925)
      IF(STRCMP(G , "ST"))
         GCF = 1.02;
      END
      IF(STRCMP(G ,"TH"))
         GCF = 1.02;
      END
      IF(STRCMP(G , "VT"))
         GCF = 1.05;
      END
      IF(STRCMP(G , "ET"))
         GCF = 1.07;
      END
   END
```

FIG. 39C

```
IF(D > 6.925 && D <= 7.675)
   IF(STRCMP(G , "ST"))
      GCF = 1.01;
   END
   IF(STRCMP(G ,"TH"))
      GCF = 1.02;
   END
   IF(STRCMP(G , "VT"))
      GCF = 1.05;
   END
   IF(STRCMP(G , "ET"))
      GCF = 1.07;
   END
END
IF(D > 7.675 && D <= 8.05)
   IF(STRCMP(G , "ST"))
      GCF = 1.01;
   END
   IF(STRCMP(G ,"TH"))
      GCF = 1.02;
   END
   IF(STRCMP(G , "VT"))
      GCF = 1.05;
   END
   IF(STRCMP(G , "ET"))
      GCF = 1.06;
   END
END

D1 = 4.67;
T1 = 3.41;
D1 = 2.90;
GCF = 1.00;

W1 = (D1.^2)*D1*CF*GCF;

MG = (GCF - 1)*D;

D = ((TAND(B)*((D-T)/2)) + (TAND(A)*(D/2))) + MG;

WEIGHT = (D.^2)*D*CF*GCF;
END
```

KEY TO FIG. 39:

COMPARING GEMSTONE SIGNATURES USING ANGULAR SPECTRUM INFORMATION

TECHNICAL FIELD

The described embodiments relate generally to faceted structure analysis and grading.

BACKGROUND INFORMATION

Faceted structures are often mounted in jewelry and other accessories. Rings, bracelets, necklaces, glasses, and watches are commonly adorned with faceted structures that provide visual appeal to these items. The visual appeal results in part from the illumination properties of the faceted structure. As light enters the faceted structure, some of the entering light is internally reflected within the structure and redirected to the eye of an observer. This effect makes the faceted structure appear illuminated.

One popular type of faceted structure is a diamond gemstone. Quality of diamond gemstones is typically assessed by carat weight, color grade, clarity grade, and cut grade. Carat weight has units of metric carats. One carat is equal to 0.2 grams. The weight of a diamond gemstone is determined by first measuring a volume of the diamond gemstone. When the diamond gemstone is mounted in a setting, not all dimensions of the gemstone are readily available for measurement. Highly skilled gemologists are able to estimate the volume using calipers despite the gemstone being mounted in the setting. However, reliability is an issue. For example, one gemologist might have different estimates of volume than another gemologist. While variation in volume might appear slight, any variation in volume might have significant cost implications due to the extraordinary value of some diamonds. In addition, it is highly desirable to maintain the reputation of a gemologist and variations in weight estimation places the reputation of the gemologist in jeopardy.

Another way to ascertain the dimensions of the mounted gemstone is to remove the gemstone from the setting. After removal, the gemstone is weighed using a scale and the gemstone is re-mounted in the setting. Although this provides a precise estimate of gemstone volume and weight, this technique risks damage to the setting. Moreover, some items with mounted settings have significant emotional value as in the case of family heirlooms. Additionally, removal of the gemstone from the setting exposes the gemologists to risk of real or perceived loss of the gemstone.

Gemstone dimensions are often useful in other aspects of the gemstone industry. Gemstone dimensions are commonly used in identifying and tracking particular gemstones. For example, an entity that distributes gemstones might sell an item with a mounted gemstone to a customer. At some later time, the customer may return the item with the mounted gemstone for repair, trade-in, or consignment. It is usually desirable to validate that the item with the mounted gemstone is the same as the original item that was provided to the customer initially at the earlier date. However, due to the physical qualities of many settings, it is difficult to reliably and consistently obtain some of the critical dimensions of the mounted gemstone. A solution that overcomes these challenges is desirable.

SUMMARY

A faceted structure analysis system comprises a faceted structure imaging assembly and a faceted structure image analyzer. The faceted structure analysis system is operable to obtain dimensions used to determine volume and to obtain signature information of the faceted structure. The faceted structure analysis system operates while the faceted structure is in a mounted setting and does not require all aspects of the faceted structure to be visible to obtain either the dimensions or the signature information. Typical mounted settings hide the culet from view which is useful in ascertaining a depth of the faceted structure. The depth in turn is used to determine the volume and carat weight of the faceted structure. The faceted structure analysis system estimates the depth and other various dimensions of the faceted structure while in the mounted setting and while various aspects of the faceted structure are not readily accessible.

The faceted structure imaging assembly includes an image sensor, a faceted structure holder, a cylinder having an aperture and a plurality of color features along an inner surface of the cylinder, and a light source. The faceted structure holder holds and retains a faceted structure. The faceted structure holder is disposed above the light source and below the image sensor. The image sensor is in a downward facing orientation configured to capture and sense image information along an upper surface of faceted structure retained by the faceted structure holder. In one example, the faceted structure holder is an amount of foam having an opening that receives the faceted structure in the mounted setting, and a telecentric lens is used by the image sensor to generate images of the faceted structure.

The faceted structure imaging assembly is operable in a first mode and in a second mode. In the first mode, the faceted structure imaging assembly obtains an image of a top surface of the faceted structure. The faceted structure imaging assembly does not employ the cylinder or the light source when configured in the first mode. In the second mode, the cylinder is placed above the light source such that the cylinder surrounds the faceted structure holder and the light source is activated. Colored light is reflected from the color features disposed along the inner surface of the cylinder and onto the faceted structure. The faceted structure, in turn, redirects some of the reflected color light through the aperture of the cylinder. The image sensor captures the redirected colored light. The redirected colored light indicates angular spectrum information of the faceted structure. The angular spectrum information of the faceted structure is used to compare to other angular spectrum information to obtain critical dimensions useful in assessing the volume of the faceted structure and is also used to validate a source of the faceted structure.

In one embodiment, the faceted structure analysis system is configured to determine carat weight of a gemstone while in a mounted setting. In a first mode, the imaging assembly obtains a first image of a top surface of the gemstone. The faceted structure image analyzer uses the first image to obtain at least one dimension of the gemstone. For example, the faceted structure image analyzer uses the first image to obtain a table length and a diameter of the gemstone. In a second mode, the imaging assembly obtains a second image of the top gemstone surface while a colored light pattern is reflected onto the gemstone. The image analyzer uses the second image to obtain at least one other gemstone dimension by comparing the second image to reference images. The reference images have known dimensions, such as crown angles and pavilion angles. In one example, the reference images are generated digitally. As a result of the comparing, dimensions of the faceted structure are obtained. The image analyzer uses the dimensions obtained from the first and second images to determine weight information of the gemstone. The faceted structure analysis system is used to quickly determine gemstone weight reliably and consistently without skilled gemologists and without needing to remove the gemstone from the setting.

In another embodiment, signature information of a gemstone is obtained using a faceted structure analysis system. The signature information is compared to stored signature information. The signature information includes angular spectrum information generated by the imaging assembly while a colored light pattern is reflected onto the gemstone. For example, the angular spectrum information is obtained while the faceted structure imaging system is operating in the second mode. The signature information uniquely identifies the gemstone and indicates whether an entity was the source of the gemstone. The signature information comparison involves comparing an angular spectrum image obtained by the imaging assembly to stored angular spectrum images. In one example, the faceted structure analysis system compares the obtained signature information to stored signature information to validate a source of the gemstone. In another example, the faceted structure analysis system obtains signature information of the gemstone and forwards the signature information to a remote validation system. The remote validation system compares the signature information to stored signature information. The remote validation system forwards a validation result to the faceted structure analysis system. The validation result received from the remote validation system is used to validate a source of the gemstone.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 23 is a diagram of angular spectrum information 96 that is captured and generated by the image sensor 40.

FIG. 29 is a diagram that shows the color bin structure 135 upon initialization.

FIG. 30 shows a color bin structure 136 of the captured image.

FIG. 31 is a diagram that shows color bin structures for each reference image.

FIG. 32 is a diagram that shows a sum of absolute difference (SAD) operation performed between the image obtained by image sensor 40 and each reference image.

FIG. 33 is a diagram of a matrix 141 having three columns that shows the resulting SAD operation for each reference image along with the corresponding crown angle and pavilion angle.

FIG. 34 is a diagram that shows a result of a sort operation of matrix 141 of FIG. 33.

FIGS. 39A, 39B, 39C, and 39D together form FIG. 39 which is an amount of instructions 150 for estimating weight of a faceted structure.

DETAILED DESCRIPTION

Reference will now be made in detail to some exemplary embodiments of the invention, examples of which are illustrated in the accompanying drawings.

Figure 1:
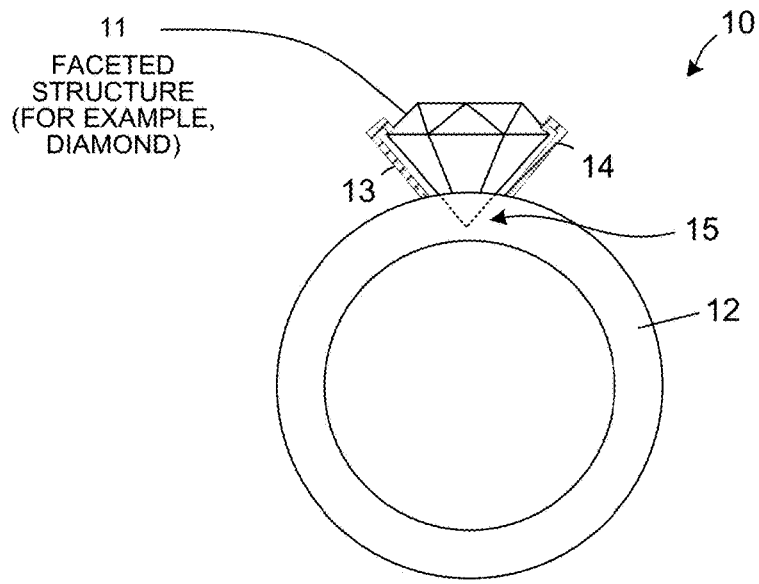
FIG. 1 is a diagram showing a cross-sectional view of a jewelry item 10 with a mounted faceted structure 11.

FIG. 1 is a diagram showing a cross-sectional view of an item 10 with a mounted faceted structure 11. In the example of FIG. 1, the jewelry item 10 is a ring 12. The faceted structure 11 is attached to the ring 12 by prongs 13 and 14. The faceted structure 11 has desirable illumination characteristics that provide visual appeal to the item 10. The faceted structure 11 is a clear gemstone, a colored gemstone, a mineral crystal, a faceted cut material, or a faceted amorphous structure. In this example, the faceted structure 11 is a diamond gemstone. The bottom portion of the faceted structure 11 is referred to as a culet 15. When the faceted structure 11 is in the setting, the culet 15 is not visible as indicated by the dashed lines. It is understood that although some embodiments described below relate to diamonds, diamonds are but one type of faceted structure that the novel systems and techniques may be used to analyze and the present techniques are also applicable to other faceted structures, including other types of colored and colorless gemstones, mineral crystals, and faceted amorphous structures.

Figure 2:
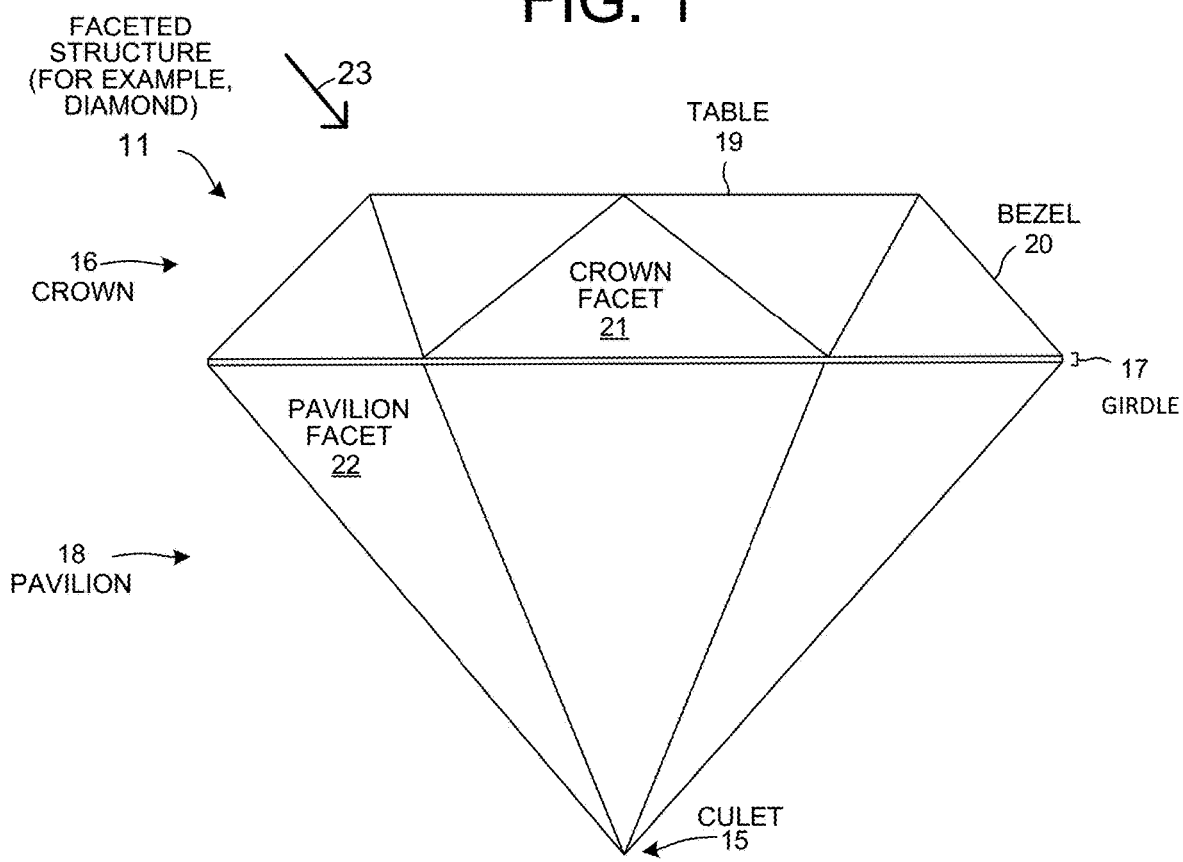
FIG. 2 is a diagram showing an enlarged cross-sectional view of the faceted structure 11 along with key structural parts.

FIG. 2 is a diagram showing an enlarged cross-sectional view of the faceted structure 11 along with key structural parts. The faceted structure 11 has a crown 16, a girdle 17, and a pavilion 18. Table 19 forms the top surface of the faceted structure 11. A bezel 20 is a slanted surface that extends from the table 19 to the girdle 17. The culet 15 is disposed at a bottom of the faceted structure 11. When the faceted structure is in the setting of FIG. 1, the culet 15 is not visible or accessible. In this embodiment, the faceted structure 11 is a standard round brilliant gemstone.

The visually appealing illumination effects of faceted structure 11 is due in part to the design and cut of the faceted structure 11. Gemstone cutters have found that by properly designing and cutting a gemstone, it is possible to capture light entering from a top of the gemstone and to redirect light to the eyes of an observer. By cutting the gemstone, a plurality of planar surfaces called facets are produced. The top facets form the crown 16 and the bottom facets form the pavilion 18. Reference numeral 21 identifies one such facet in the crown 16. Reference numeral 22 identifies one such facet in the pavilion 18. Facets typically are polygonal in their boundaries. It is appreciated that the diagram of FIG. 2 is a simplification and that faceted structure 11 usually has many more facets than those shown in FIG. 2. For example, in the case of a standard round brilliant gemstone, there are a total of fifty eight (58) facets: thirty-three (33) facets on the crown and twenty-five (25) facets on the pavilion.

As light is absorbed by the faceted structure 11, facets in the crown 16, such as crown facet 21, tend to capture light. Facets in the pavilion 18, such as the pavilion facet 22, tend to reflect light by total internal reflection. The light capturing and redirecting abilities of the faceted structure 11 make the faceted structure 11 appear illuminated. The illumination qualities of the faceted structure 11 are visually appealing and make the faceted structure 11 desirable. Gem cutters tend to select cuts that increase the illumination qualities of gemstones.

In one example of light redirection, a ray of light 23 enters the faceted structure 11 through the crown 16. Upon entry, ray 23 is split and partitioned by facets of the faceted structure 11 into a plurality of light rays that are totally internally reflected. The internally reflected rays are then reflected out of the faceted structure 11. Fresnel splitting causes the refracted beams to be split into second and higher order generations of rays that are in turn refracted out of the stone. Each refracted ray carries less and less energy due in part to Fresnel coefficients, light absorption in the bulk of the structure, and due to light scattering caused by inclusions.

Light performance of the faceted structure 11 is typically described through illumination effects that include brilliance, fire, scintillation, and leakage. Brilliance refers to the faceted structures ability to redirect light to an observer such that the crown 16 appears illuminated. Fire refers to the spectrum of colors seen by an observer when light exits the faceted structure 11. Scintillation is the illumination effect where flashes of light are produced when the structure 11 or source of light move. Leakage refers to light that exits the stone through the pavilion 18 and is not redirected through the crown 16. Leakage is generally undesirable and does not contribute to the visual appeal of the faceted structure 11.

Figures 3, 4:
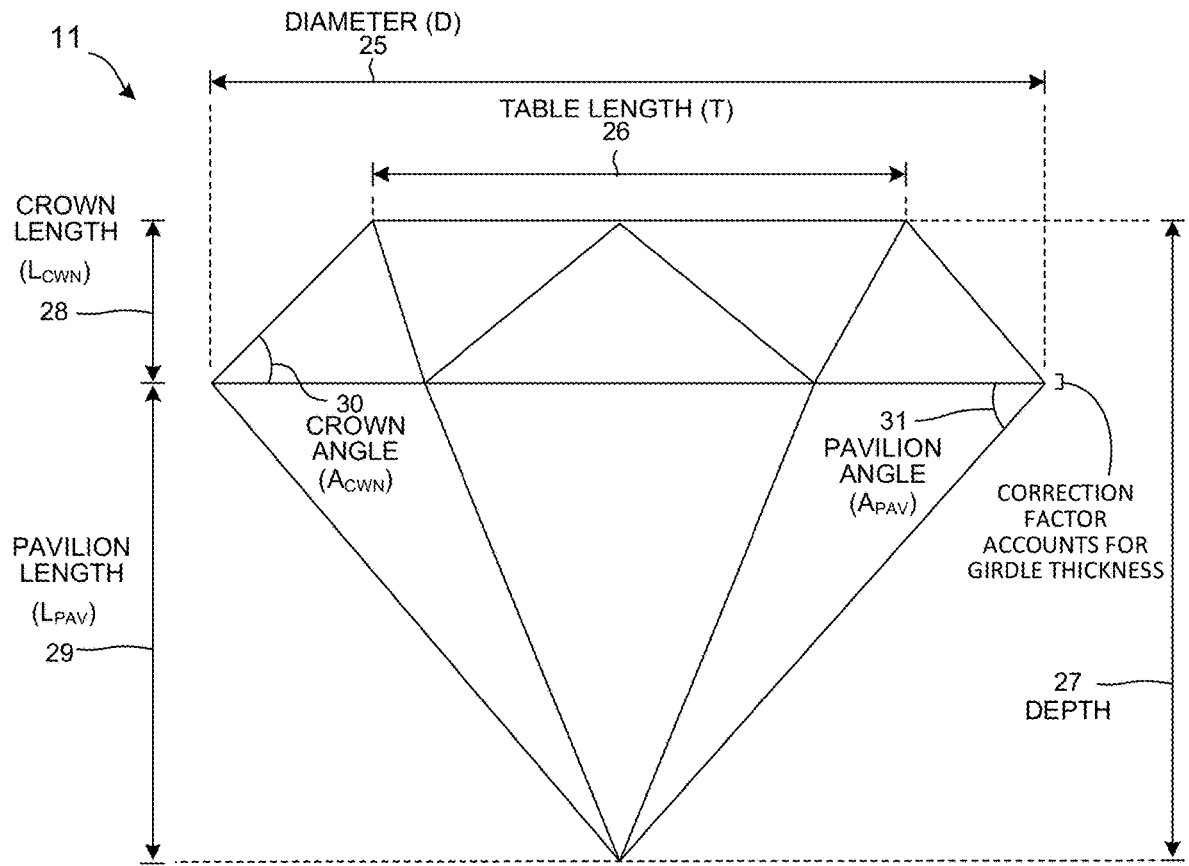
FIG. 3 is a diagram showing an enlarged cross-sectional view of the faceted structure 11 along with various geometrical dimensions.
FIG. 4 is an equation that estimates weight of a faceted structure.

FIG. 3 is a diagram showing an enlarged cross-sectional view of the faceted structure 11 along with various geometrical dimensions. The dimensions identified in FIG. 3 are used in determining a volume of the faceted structure 11. The volume of the faceted structure 11 is, in turn, used to determine the weight of the faceted structure 11. The weight is also referred to in the art as the carat weight. The dimensions of the faceted structure 11 include a diameter (D) 25, a table length (T) 26, a depth 27, a crown length ($L_{CWN}$) 28, a pavilion length ($L_{PAV}$) 29, a crown angle ($A_{CWN}$) 30, and a pavilion angle ($A_{PAV}$) 31. The table length 26 extends from one end of the table 19 to another end of the table 19. The diameter 25 extends from one end of the girdle 17 to another end of the girdle 17. The crown length 28 extends from the table 19 to the girdle 17. The pavilion length 29 extends from the girdle 17 to the culet 15. The crown angle 30 is the angle between the bezel 20 and the girdle 17. The pavilion angle 31 is the angle between the girdle 17 and the pavilion surface. In the example of FIG. 3, the girdle is not shown. In estimating weight, the girdle thickness is accounted for using a correction factor.

FIG. 4 is an equation that estimates weight of a faceted structure. The weight of a faceted structure is equal to the volume multiplied by density 32. The volume is equal to a length times the width times the depth. In the case of a round faceted structure such as the faceted structure shown in FIG. 3, the length times the width is equal to the diameter 25 squared. The depth 27 is equal to the crown length 20 plus the pavilion length 29 as shown in FIG. 3. Density 32 is dependent upon the type of material of the faceted structure. The correction factor 33 corrects for the cut of the faceted structure as well as the girdle thickness of the faceted structure. As is apparent from FIG. 3, the length of the pavilion is equal to the tangent of the pavilion angle ($A_{PAV}$)

31 multiplied by half the diameter 25. The crown length 28 is equal to the tangent of the crown angle ($A_{CWN}$) 30 multiplied by half the difference between the diameter 25 and the table length 26. As will be understood in the drawings that follow, image analysis can be performed to estimate the diameter 25, the table length 26, the crown angle 30, and the pavilion angle 31. Once these critical dimensions have been ascertained, the weight of the faceted structure can be determined. The density 32 and correction factor 33 are readily available through lookup tables and are generally known by gemologists.

Figure 5:
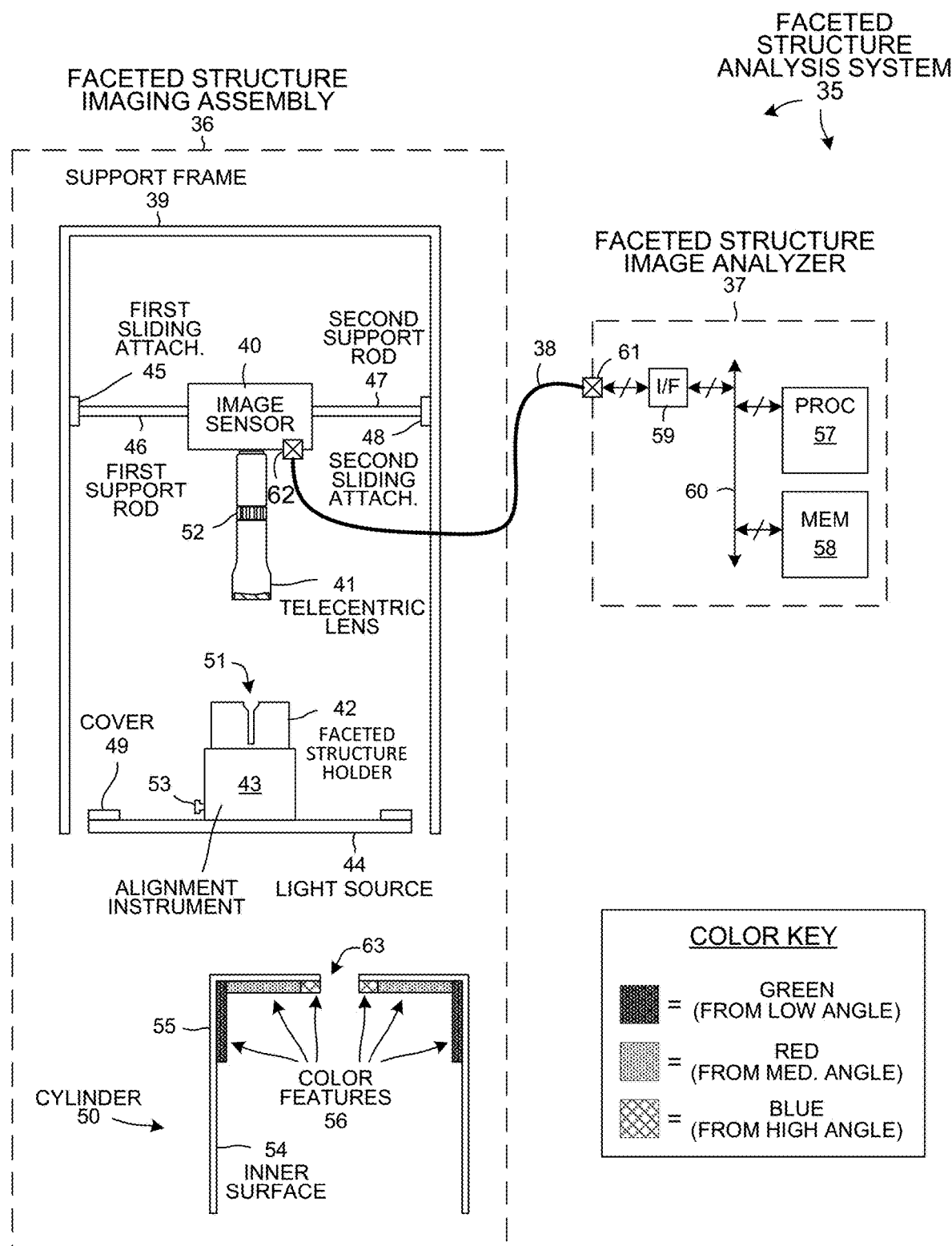
FIG. 5 is a diagram of a faceted structure analysis system 35.

FIG. 5 is a diagram of a faceted structure analysis system 35. The faceted structure analysis system 35 comprises a faceted structure imaging assembly 36 and a faceted structure image analyzer 37. The faceted structure imaging assembly 36 communicates with the faceted structure image analyzer 37 via cable and conductors 38. The faceted structure imaging assembly 36 is operable in a first mode and a second mode. In the first mode, the faceted structure imaging assembly 36 obtains an image of a faceted structure that is used by the faceted structure image analyzer 37 to determine the diameter 25 and the table length 26 of the faceted structure. In the second mode, the faceted structure imaging assembly 36 obtains an image of the faceted structure that is used by the faceted structure image analyzer 37 to determine the crown angle 30 and the pavilion angle 31 of the faceted structure. The faceted structure analysis system 35 is also operable to obtain weight information of faceted structures using the obtained dimensions, and to validate a faceted structure by comparing obtained signature information to prior obtained signature information.

The faceted structure imaging assembly 36 comprises a support frame 39, an image sensor 40, a telecentric lens 41, a faceted structure holder 42, an alignment instrument 43, a light source 44, a first sliding attachment 45, a first support rod 46, a second support rod 47, a second sliding attachment 48, a cover 49, and a cylinder 50. The faceted structure holder 42 has an opening 51 that receives and retains a faceted structure, such as the faceted structure 11. When a faceted structure is disposed within opening 51 and retained by the faceted structure holder 42, image sensor 40 is configured to capture an image of the faceted structure through the telecentric lens 41. Telecentric lens 41 has an adjustment mechanism 52. The alignment instrument has an alignment knob 53 that is used to adjust a working distance between an upper surface of the faceted structure holder 42 and a lower surface of the telecentric lens 41. The cylinder 50 has an inner surface 54 and an outer surface 55. The inner surface 54 of the cylinder 50 has a plurality of color features 56. In the example of FIG. 5, the color features include a green color feature, red color future, and a blue color feature.

The image sensor 40 is configured to capture images of the top surface of the faceted structure disposed and retained by the faceted structure holder 42 without (first mode) or with (second mode) cylinder 50 depending on the type of images that are being obtained. For example, in the first mode, imaging involved in determining table diameter dimensions does not involve cylinder 50. On the otherhand, in the second mode, imaging involved in determining crown and pavilion angles does involve cylinder 50. Image sensor 40 slides up and down along support frame 39 by first sliding attachment 45 and second sliding attachment 48. The first support rod 46 connects the image sensor 40 to the first sliding attachment 45. The second support rod 47 connects the image sensor 40 to the second sliding attachment 48.

The faceted structure image analyzer 37 comprises a processor 57, a memory 58, an interface 59, and a local bus 60. Processor 57 is configured to receive, store, and process images obtained by image sensor 40 via terminal 62 of the image sensor 40 through cable and conductors 38, through terminal 61 and onto interface 59. In this example, the cable and conductors 38 is a Universal Serial Bus (USB) cable with USB conductors.

Figure 6:
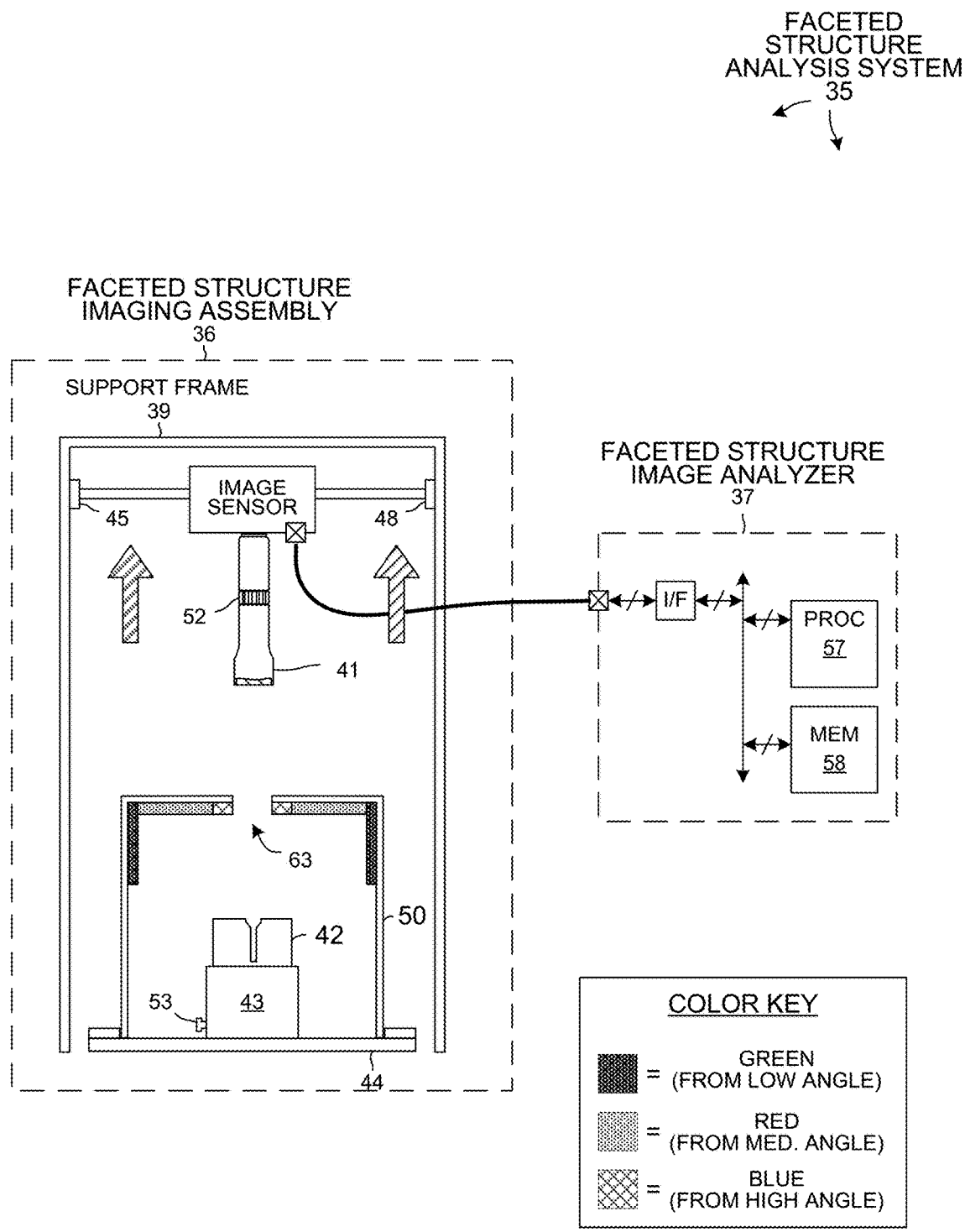
FIG. 6 is a diagram of the faceted structure analysis system 35 showing how the cylinder 50 is incorporated into the faceted structure imaging assembly 36 for operation in the second mode.

FIG. 6 is a diagram of the faceted structure analysis system 35 showing how the cylinder 50 is incorporated into the faceted structure imaging assembly 36 for operation in the second mode. To insert the cylinder 50, the image sensor 40 and telecentric lens 41 are slid upwards along the support frame 39 by the first sliding attachment 45 and by the second sliding attachment 48. Sliding the image sensor 40 and telecentric lens 41 upwards provides sufficient room such that cylinder 50 can be placed above light source 44 and cover the faceted structure holder 42.

Figure 7:
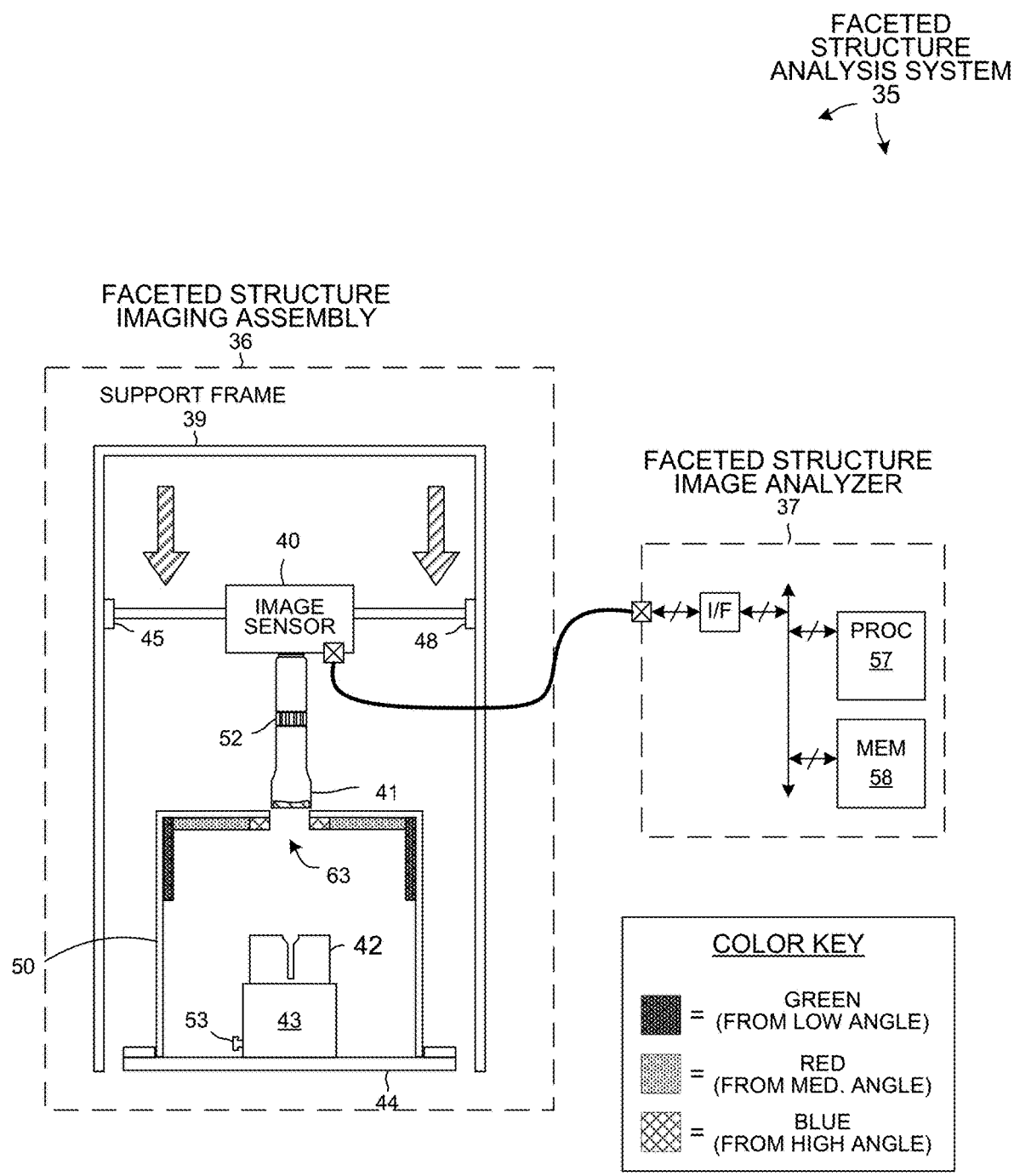
FIG. 7 is a diagram that shows the faceted structure analysis system 35 configured in the second mode.

FIG. 7 is a diagram that shows the faceted structure analysis system 35 configured in the second mode. The cylinder 50 covers the faceted structure holder 42 and the image sensor 40. In the second mode, the image sensor 40 captures and obtains angular spectrum images of faceted structures disposed and retained by the faceted structure holder 42. After the cylinder 50 is placed on top of the light source 44, the image sensor 40 and telecentric lens 41 are slid downwards along the support frame 39 so that the lower end of the telecentric lens 41 is disposed above an aperture 63 of the cylinder 50. The light source 44 is activated in the second mode.

Figure 8:
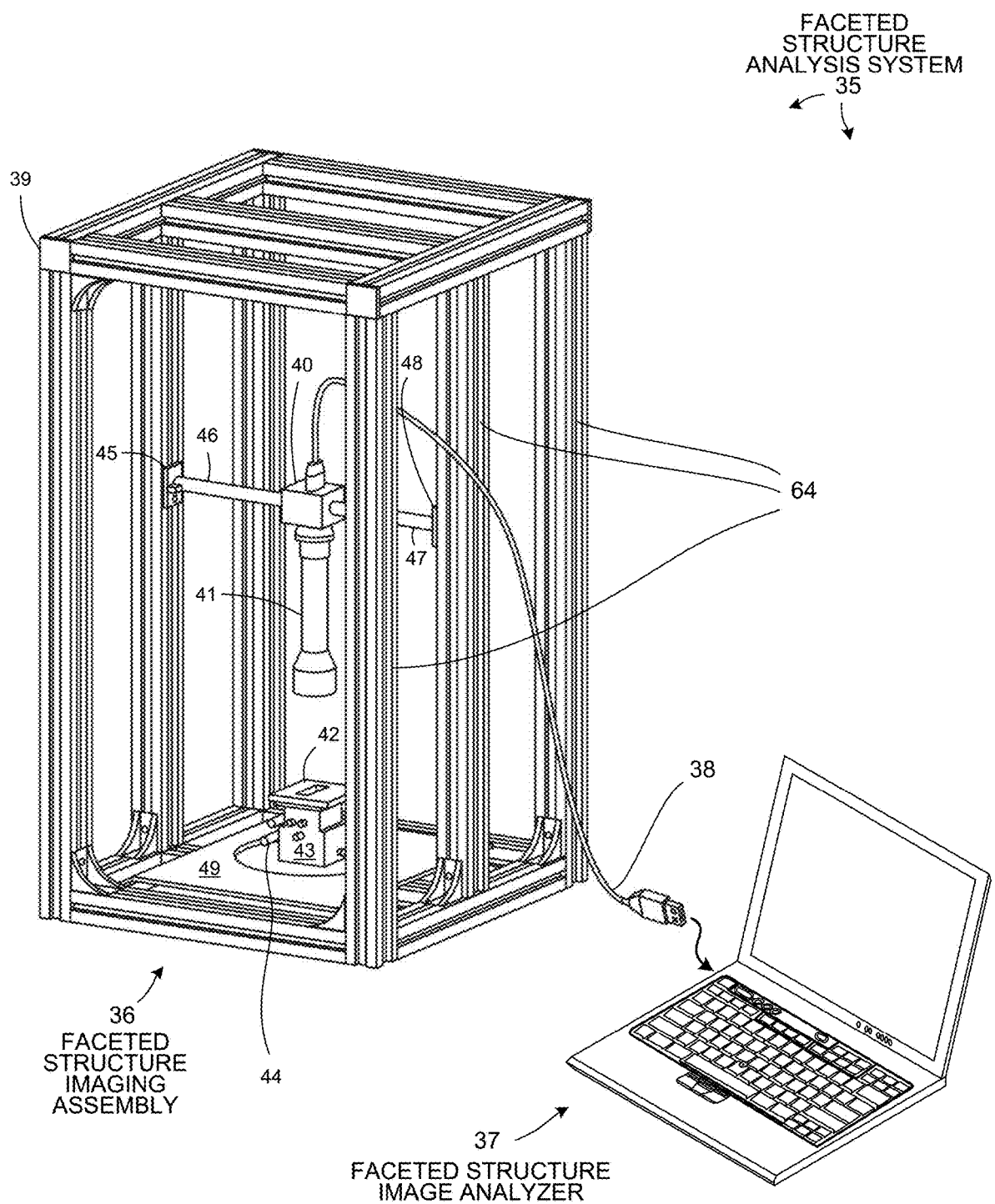
FIG. 8 is a diagram showing a perspective view of the faceted structure analysis system 35.

FIG. 8 is a diagram showing a perspective view of the faceted structure analysis system 35. The support frame 39 includes the plurality of support members 64. In this example, support frame 39 has a rectangular shape. The image sensor 40 and telecentric lens 41 slide up and down support members 64 of the support frame 39. This permits an operator to incorporate cylinder 50 to cover the faceted structure holder 42 and to remove the cylinder 50 in a simple and quick fashion.

Figure 9:
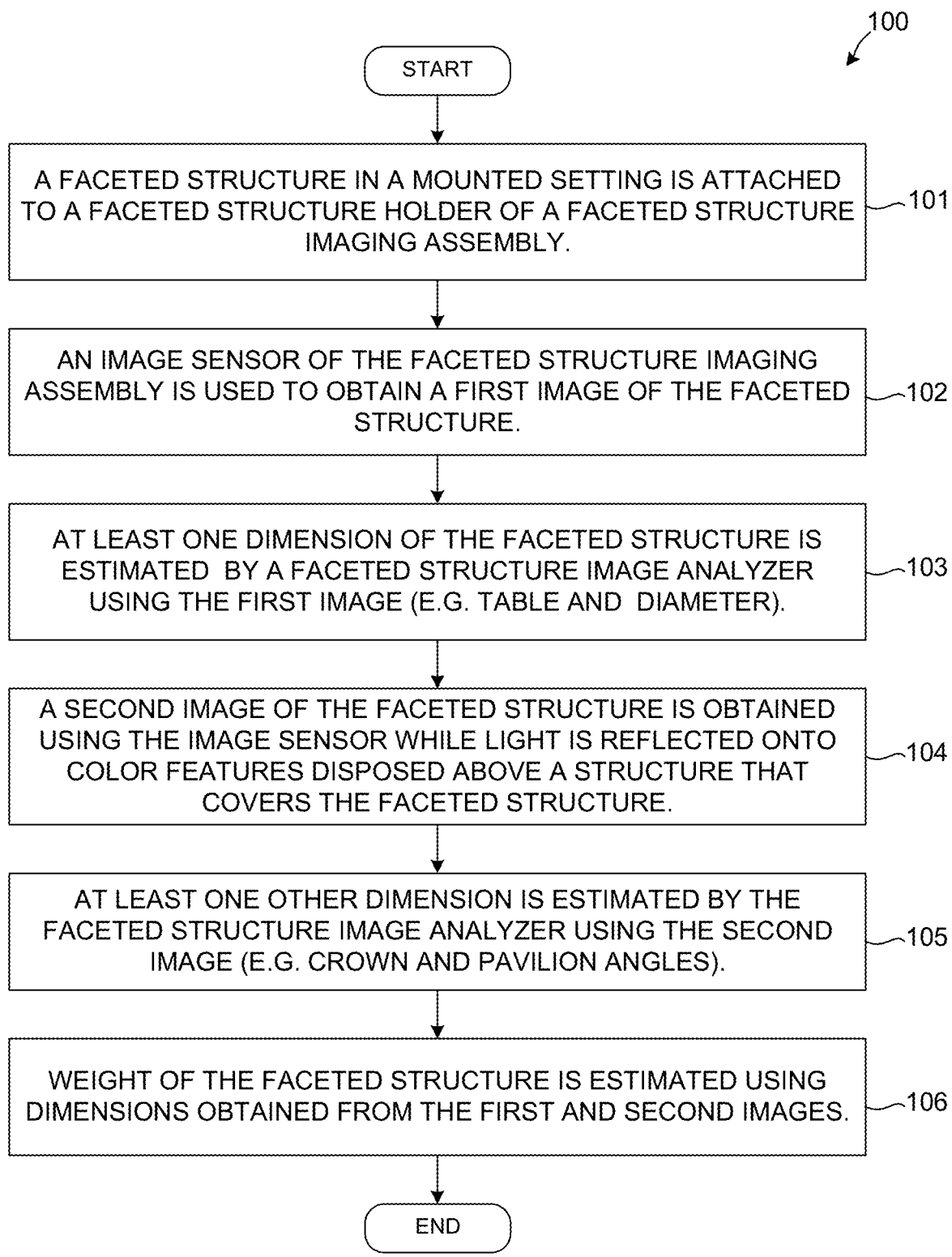
FIG. 9 is a flowchart of a method 100 in accordance with one novel aspect.

FIG. 9 is a flowchart of a method 100 in accordance with one novel aspect. In a first step (step 101), a faceted structure in a mounted setting is attached to a faceted structure holder of the faceted structure imaging assembly. For example, in FIG. 10, faceted structure 11 is inserted into opening 51 of the faceted structure holder 42.

In the second step (step 102), an image sensor of faceted structure imaging assembly is used to obtain a first image of the faceted structure. For example, in FIG. 11, the faceted structure imaging assembly 36 is configured in the first mode. The image sensor 40 and telecentric lens 41 are used to obtain an image of a top surface of the faceted structure 11.

Figure 12:
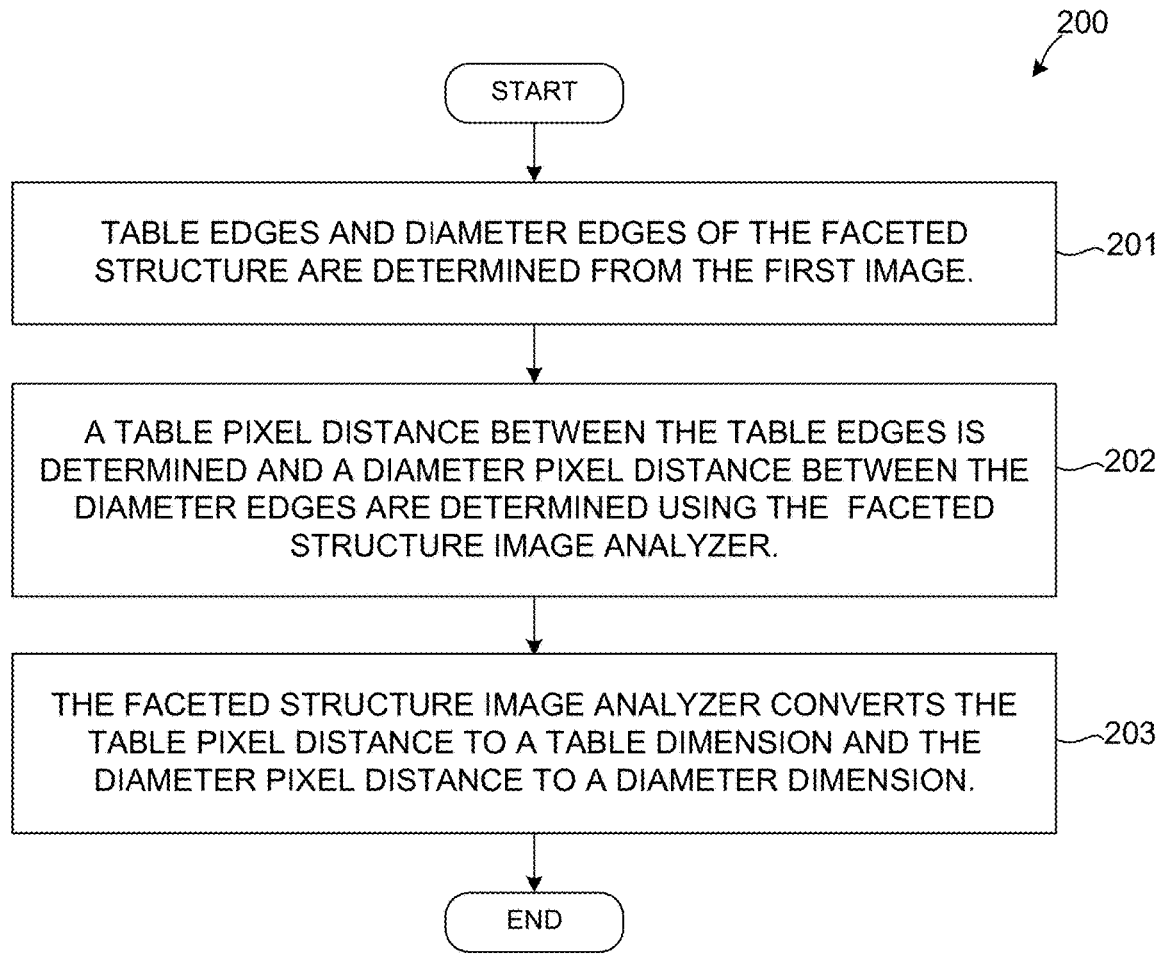
FIG. 12 is a flowchart of a method 200 in accordance with another novel aspect.

In a third step (step 103), at least one dimension of the faceted structure is estimated by the faceted structure image analyzer using the first image. The at least one dimension of the faceted structure is in one example, the table dimension or a diameter dimension. In FIG. 12, one technique of obtaining the at least one dimension using the first image is shown.

In a fourth step (step 104), the second image of the faceted structure is obtained using the image sensor while light is reflected onto color features disposed above a structure that covers the faceted structure. For example, in FIGS. 13-23, the faceted structure imaging assembly 36 is configured in the second mode and show one example of how a second image 96 is obtained.

Figure 36:
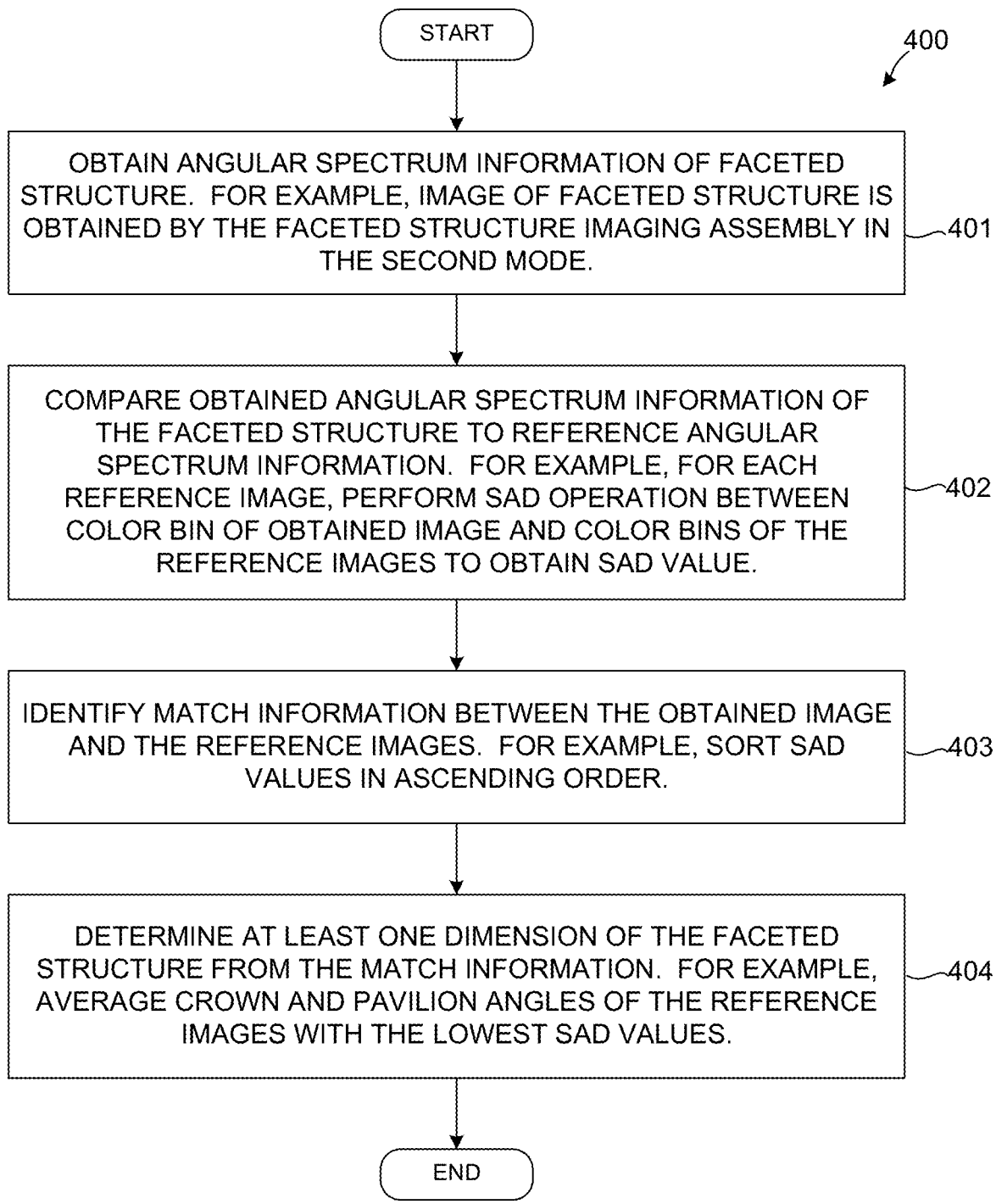
FIG. 36 is a flowchart of a method 400 in accordance with another novel aspect.

In a fifth step (step 105), at least one other dimension of the faceted structure is estimated by the faceted structure image analyzer using the second image. In one example, the at least one other dimension is a crown or pavilion angle of the faceted structure. FIG. 36 shows one technique for how the at least one other dimension is obtained using the second image.

In a sixth step (step 106), a weight of the faceted structure is estimated using dimensions obtained from the first and second images. For example, processor 57 determines weight of a faceted structure using the equation of FIG. 4. The density 32 and correction factor 33 are supplied to the processor 57 by user input 118 (shown in FIG. 25). Computer readable instructions 150 shown in FIG. 39 show one novel technique of estimating weight of a faceted structure.

Figure 10:
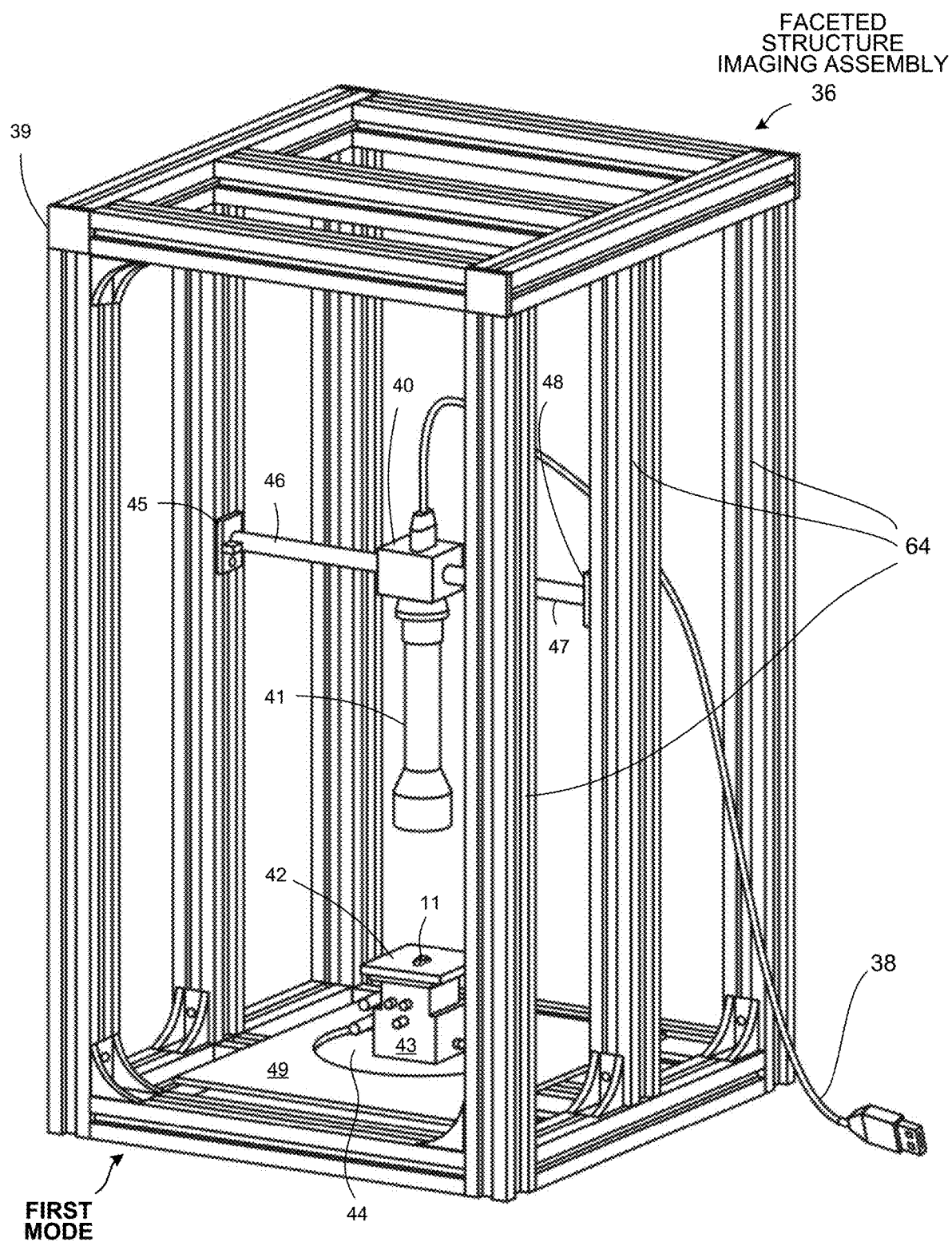
FIG. 10 is a perspective diagram showing the faceted structure 11 attached and retained to the faceted structure holder 42.

FIG. 10 is a perspective diagram showing the faceted structure 11 attached and retained to the faceted structure holder 42. In FIG. 10, the faceted structure imaging assembly 36 is configured in the first mode. The cylinder 50 is not involved in the first mode. The telecentric lens 41 is adjusted and the alignment instrument 53 is adjusted such that an upper surface of the faceted structure 51 is in focus. The telecentric lens 41 ensures that the bezel 20 and the diameter 25 extent of the girdle 17 are also in focus. Obtaining a focused and a high-resolution image of the crown 16 and girdle 17 with the image sensor 40 permits the faceted structure image analyzer 37 to determine diameter and table dimensions of the faceted structure 11.

Figure 11:
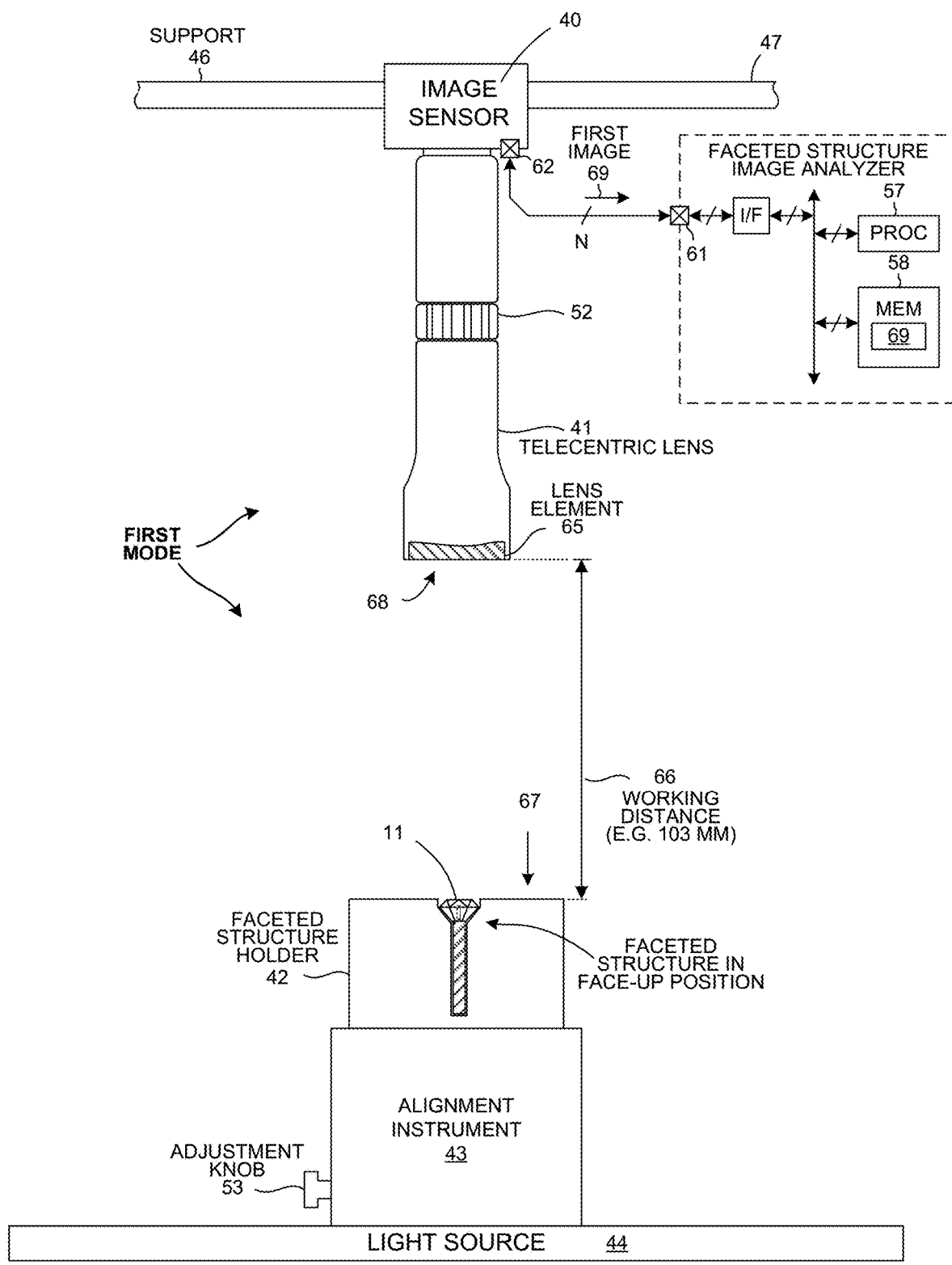
FIG. 11 is a diagram showing the faceted structure imaging assembly 36 in the first mode.

FIG. 11 is a diagram showing the faceted structure imaging assembly 36 in the first mode. The faceted structure 11 is in the face up position and retained by the faceted structure holder 42. An end 68 of the telecentric lens 41 has a lens element 65. The telecentric lens 41 is configured and adjusted via adjustment mechanism 52 such that an upper surface 67 of the faceted structure holder 42 is in focus. Reference numeral 66 identifies a working distance between an end 68 of the telecentric lens 41 and the upper surface 67 of the faceted structure holder 42. In one example, the working distance is 103 mm. The alignment instrument 43 is used to adjust the working distance 66 between lower end 68 of the telecentric lens 41 and upper surface 67 of the faceted structure holder 42. The alignment instrument 43 is adjusted by the adjustment knob 53. Image sensor 40 captures and obtains a first image 69. The first image 69 is an image of the top surface of the faceted structure 11. The first image 69 is communicated from the image sensor 40 through terminal 62, through cable and conductors 38 and onto terminal 61. The first image 69 is stored in memory 58 and processed by processor 57.

FIG. 12 is a flowchart of a method 200 in accordance with another novel aspect. Method 200 is used to obtain at least one dimension of the faceted structure from the first image. In a first step (step 201), edges of the table and diameter dimensions of the faceted structure are determined from the first image. In one embodiment, the faceted structure image analyzer 37 is running MATLAB and the first image 69 is read into MATLAB. MATLAB is available from Mathworks located at 3 Apple Hill Drive, Natick, Mass. 01760 USA and from the following webpage: https://www.mathworks.com/company.html. The edges of the table and diameter are identified by an operator identifying the edges with an input device. In another embodiment, edge detection techniques are employed to programmatically identify these edges.

In the second step (step 202), a table pixel distance between the table edges is determined and a diameter pixel distance between the diameter edges is determined using the faceted structure image analyzer. For example, after the edges of the table and diameter are identified by an operator, a MATLAB image tool is used to count the number of pixels between both features.

In third step (step 203), the faceted structure image analyzer converts the table pixel distance to a table dimension and the diameter pixel distance to a diameter dimension. For example, a ruler is placed along the top surface 67 of the faceted structure holder 42. The ruler is captured by image sensor 40 and the distance is indicated in the MATLAB image tool. This information indicates a physical distance that each pixel corresponds to. Once the number of pixels between each feature is known, then the distance is obtained by multiplying each of the table pixel distance and diameter pixel distance by the physical distance represented by one pixel.

Figure 13:
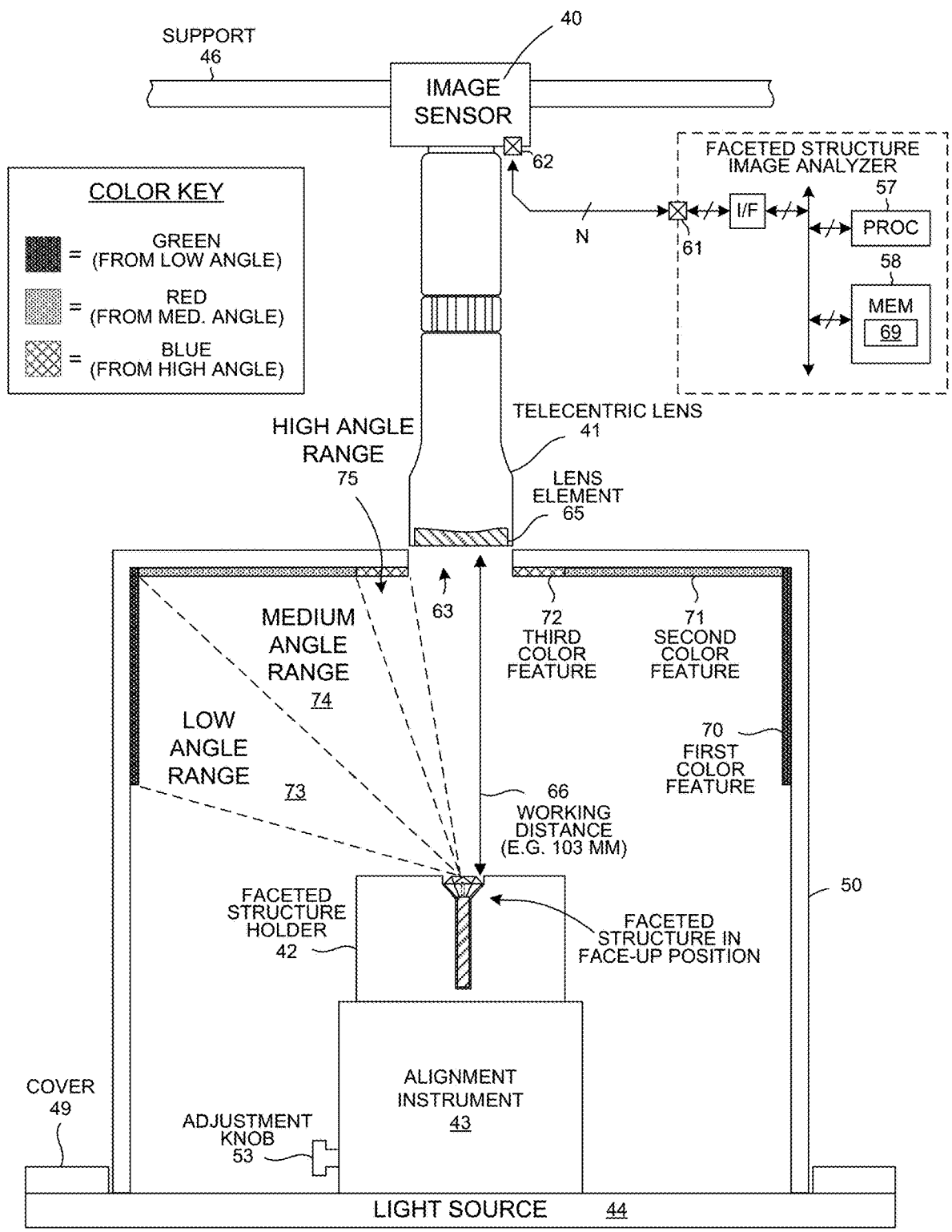
FIG. 13 is a diagram that shows the faceted structure imaging assembly 36 configured in the second mode.

FIG. 13 is a diagram that shows the faceted structure imaging assembly 36 configured in the second mode. The second mode employs the cylinder 50. Cylinder 50 includes a first color feature 70, a second color feature 71, and a third color feature 72. Light source 44 emits diffused omnidirectional light that is reflected from the upper inner surface 54 of the cylinder 50 and, in turn, onto the faceted structure 11. Light reflected by the inner surface 54 of cylinder 50 is reflected according to the first color feature 70, the second color feature 71, and the third color feature 72. The light reflected by the first color feature 70 enters the faceted structure 11 from a low angle range 73. Light reflected by the second color feature 71 enters the faceted structure 11 from a medium angle range 74. Light reflected by the third color feature 72 enters the faceted structure 11 from high angle range 75. In this example, the first color feature 70 is green in color. The second color feature 71 is red in color. The third color feature 72 is blue in color. The color features of the cylinder 50 are used in performing and obtaining angular spectrum images of the faceted structure 11. It is understood that other color features may be used, so long as the reference images employ equivalent colors that correspond to the angular ranges of entering light rays.

Figure 14:
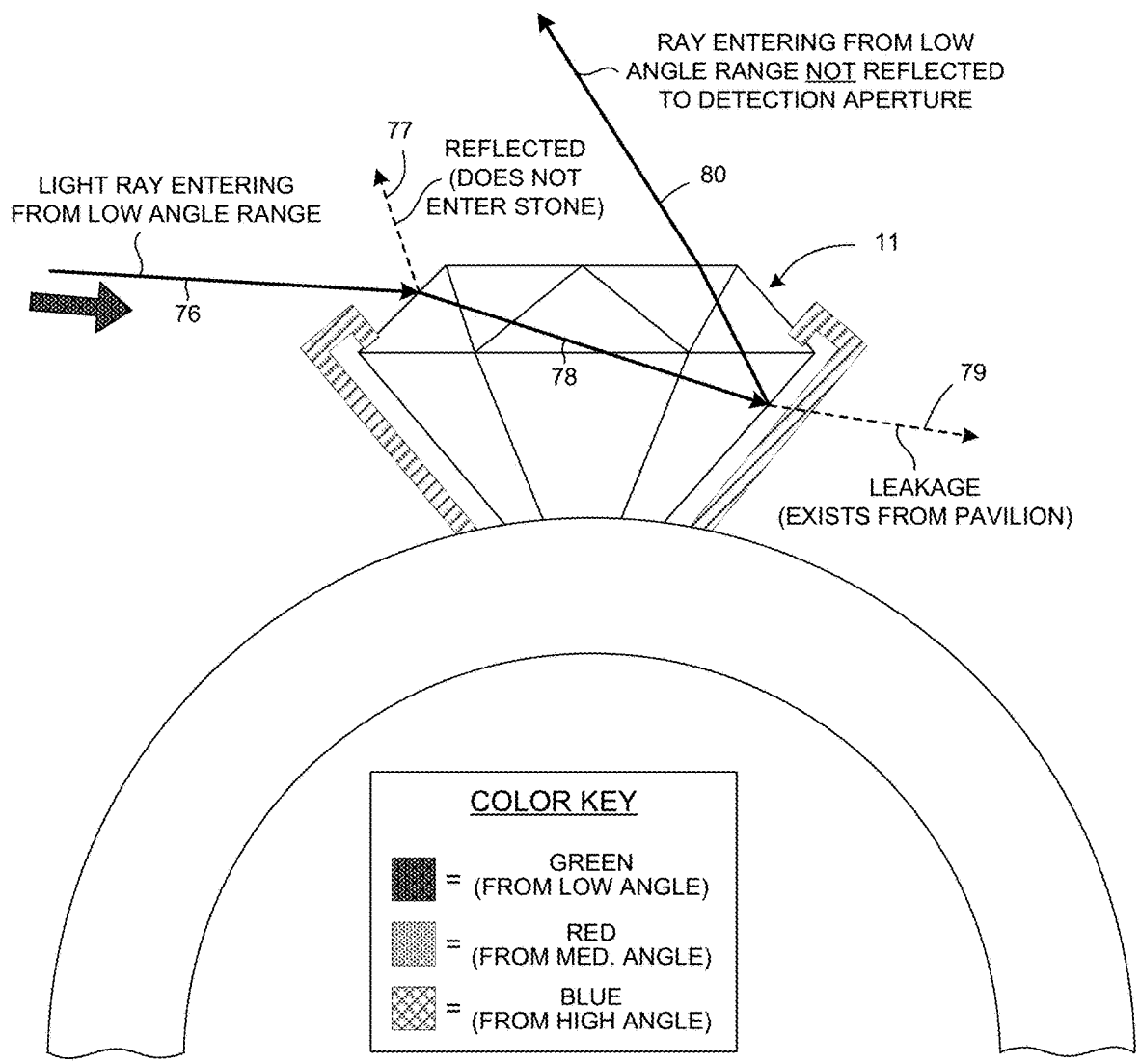
FIG. 14 is a diagram of a cross-sectional view of the faceted structure 11 showing how a beam of light 76 enters the faceted structure 11 from a low angle range 73.

FIG. 14 is a diagram of a cross-sectional view of the faceted structure 11 showing how a beam of light 76 enters the faceted structure 11 from a low angle range 73. Beam of light 76 enters the crown 16 of the faceted structure 11. Ray 77 represents a portion of entering light that is reflected and ray 78 represents a portion of light that enters the faceted structure 11. Internal ray 78 is internally reflected and output from the faceted structure 11 as indicated by reference numeral 80. A portion of the internally reflected ray 78 exits the faceted structure via the pavilion 18 as indicated by reference numeral 79. Due to the low range angle of the entering being 76, ray 80 exiting faceted structure 11 is not likely to enter the detection aperture 63 of cylinder 50.

Figure 15:
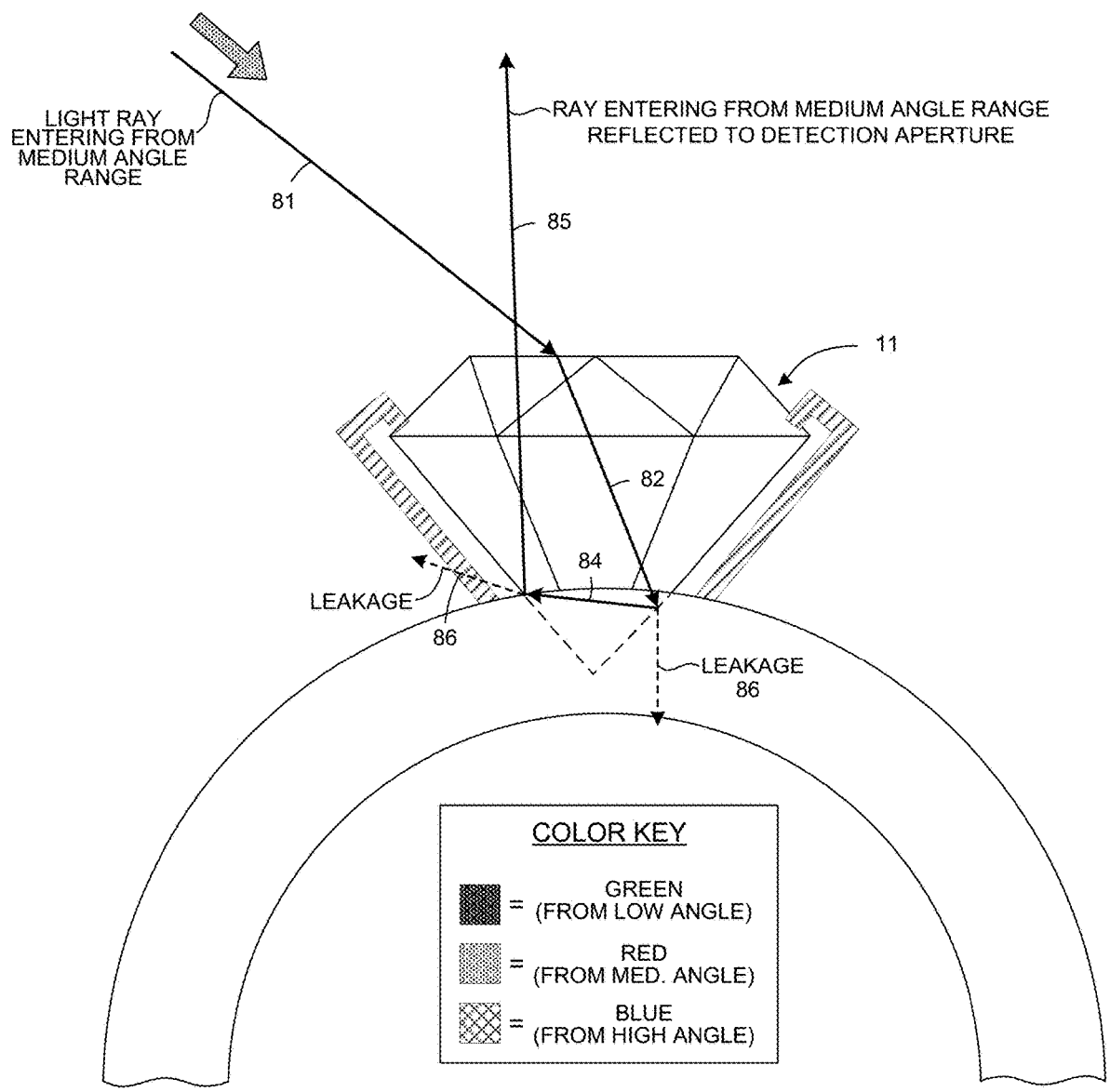
FIG. 15 is a cross-sectional diagram of the faceted structure 11 showing how a beam of light 81 enters the faceted structure 11 from a medium range angle 74.

FIG. 15 is a cross-sectional diagram of the faceted structure 11 showing how a beam of light 81 enters the faceted structure 11 from a medium range angle 74. Ray 81 enters the faceted structure 11 and is internally reflected as indicated by ray 82. Ray 82 is internally reflected via ray 84 and exits the stone via ray 85. Reference numeral 86 indicates leakage out of the pavilion 18. Redirected ray 85 is likely to reach the detection aperture 63. This is due to the medium angle range 74 from which the entering ray 81 enters the faceted structure 11.

Figure 16:
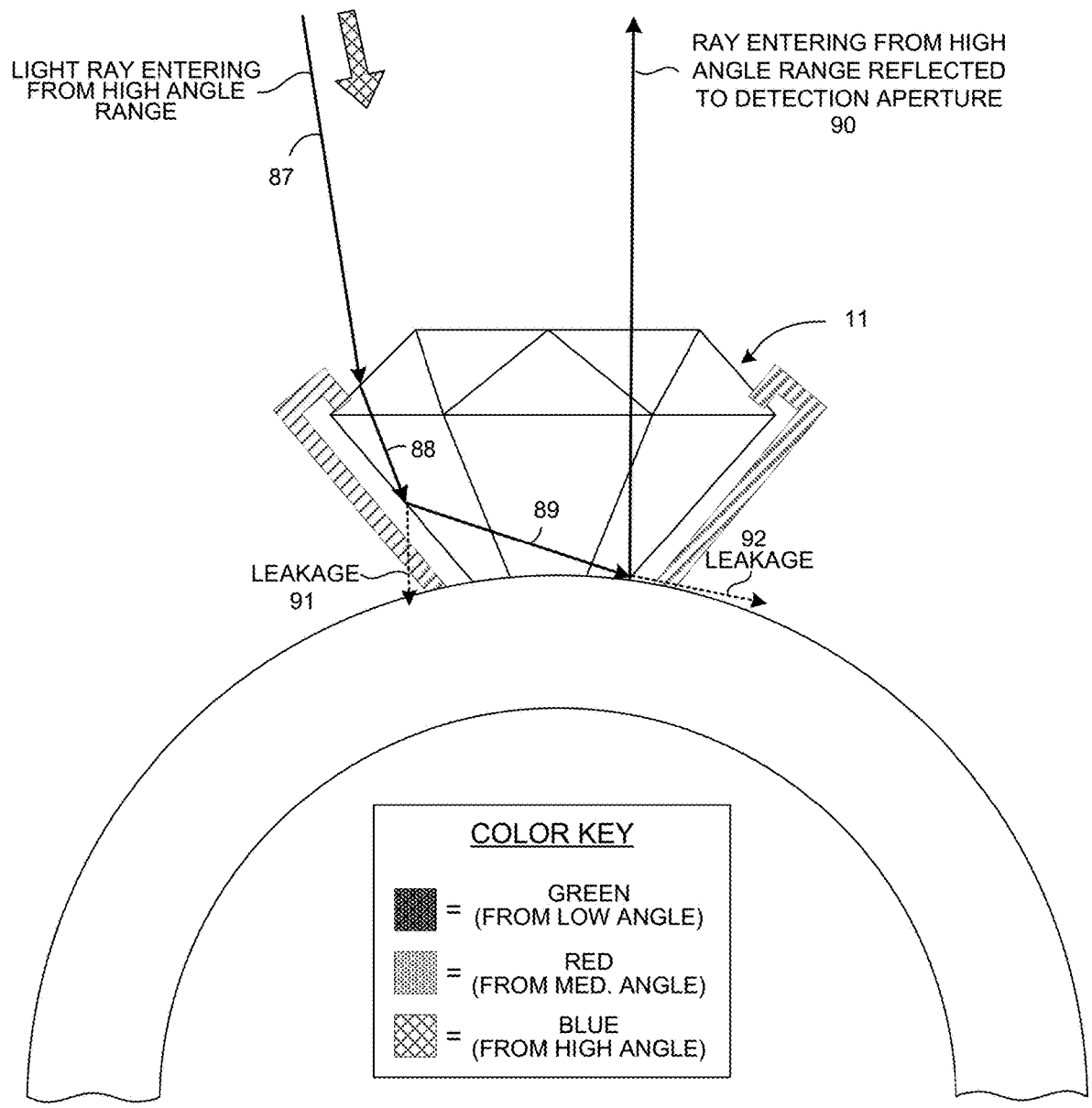
FIG. 16 is a diagram that shows how a beam of light 87 enters the faceted structure 11 from a high angle range 75.

FIG. 16 is a diagram that shows how a beam of light 87 enters the faceted structure 11 from a high angle range 75. Ray 87 enters the crown 16 and is reflected internally as indicated by reference numerals 88 and 89. Entering ray 87 is eventually reflected out of the stone as shown by ray 90. Reference numerals 91 and 92 identify leakage out the pavilion 18. Reflected ray 90 is likely to reach detection aperture 63 of the cylinder 50.

Figure 17:
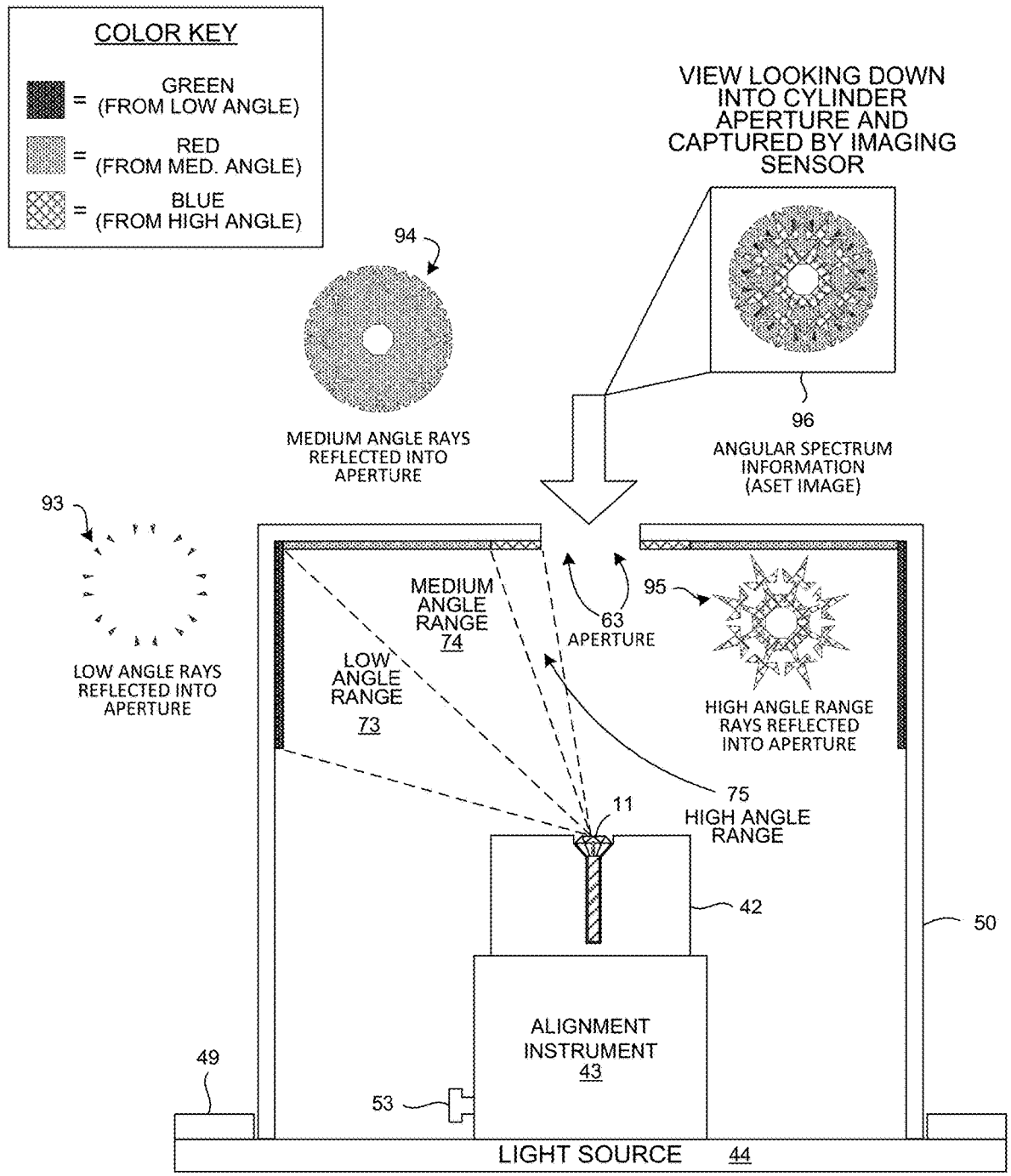
FIG. 17 is a diagram that shows how color features of cylinder 50 are used to generate angular spectrum information of the faceted structure 11.

FIG. 17 is a diagram that shows how color features of cylinder 50 are used to generate angular spectrum information of the faceted structure 11. In this example, light source 44 is a Light Emitting Diode (LED) light box that outputs diffused and omnidirectional white light. The light output by the LED light box 44 is reflected by the light features 70, 71, and 72 disposed on the upper interior surface 54 of cylinder 50. The colored light is in turn reflected from the inner surface 54 of cylinder 50 onto the faceted structure 11. Reference numeral 93 identifies light rays entering from the low angle range 73 that enter faceted structure 11 and that are redirected to aperture 63 of the cylinder 50. Reference numeral 94 identifies light rays that enter the faceted structure 11 from the medium angle range 74 and that are redirected to aperture 63 of the cylinder 50. Reference numeral 95 represents light rays entering the faceted structure 11 from the high angle range 75 and that are redirected to aperture 63 of the cylinder 50. Angular spectrum information 96 is collected and obtained from the image sensor 40. As shown in FIG. 17, the majority of rays contributing to the angular spectrum information 96 enter from the medium angle range 74. Most of the rays entering from the low angle range 73, on the other hand, are not redirected back onto the aperture 63. By reflecting light of different color from different angular ranges, angular spectrum information 96 can be collected and used to determine how light is reflected by faceted structure 11. Angular spectrum information 96 also indicates structural characteristics and dimensions of the faceted structure 11. In this example, light entering from the low angle range 73 has a green color, light entering from the medium angle range 74 has a red color, and light entering from the high angle range 75 has a blue color.

Figure 18:
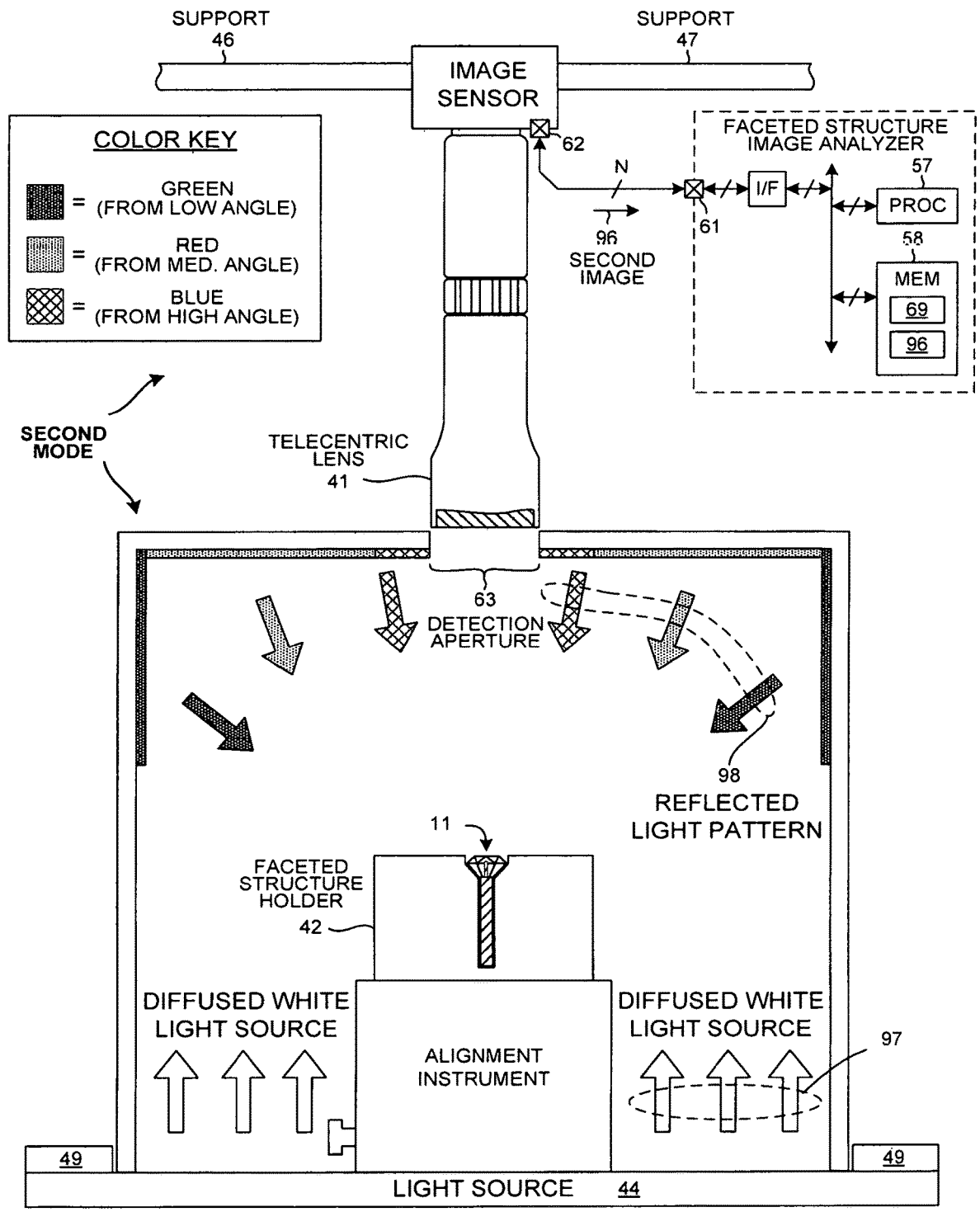
FIG. 18 is a diagram showing the faceted structure imaging assembly 36 configured in the second

FIG. 18 is a diagram showing the faceted structure imaging assembly 36 configured in the second mode. In the second mode, cylinder 50 is used to reflect light pattern 98 onto the faceted structure 11. The light source 44 outputs omnidirectional diffuse white light 97. The omnidirectional diffuse white light 97 is reflected from the light features on the inner surface 54 of cylinder 50. The reflected light enters the faceted structure 11 from various angular ranges as described with respect to FIG. 17. Light that is redirected onto the detection aperture 63 is captured by the image sensor 40 through the telecentric lens 41. The image sensor 40 generates and outputs a second image 96 that is stored in memory 58 of the faceted structure image analyzer 37. The second image 96 is angular spectrum information of the faceted structure 11.

Figure 19:
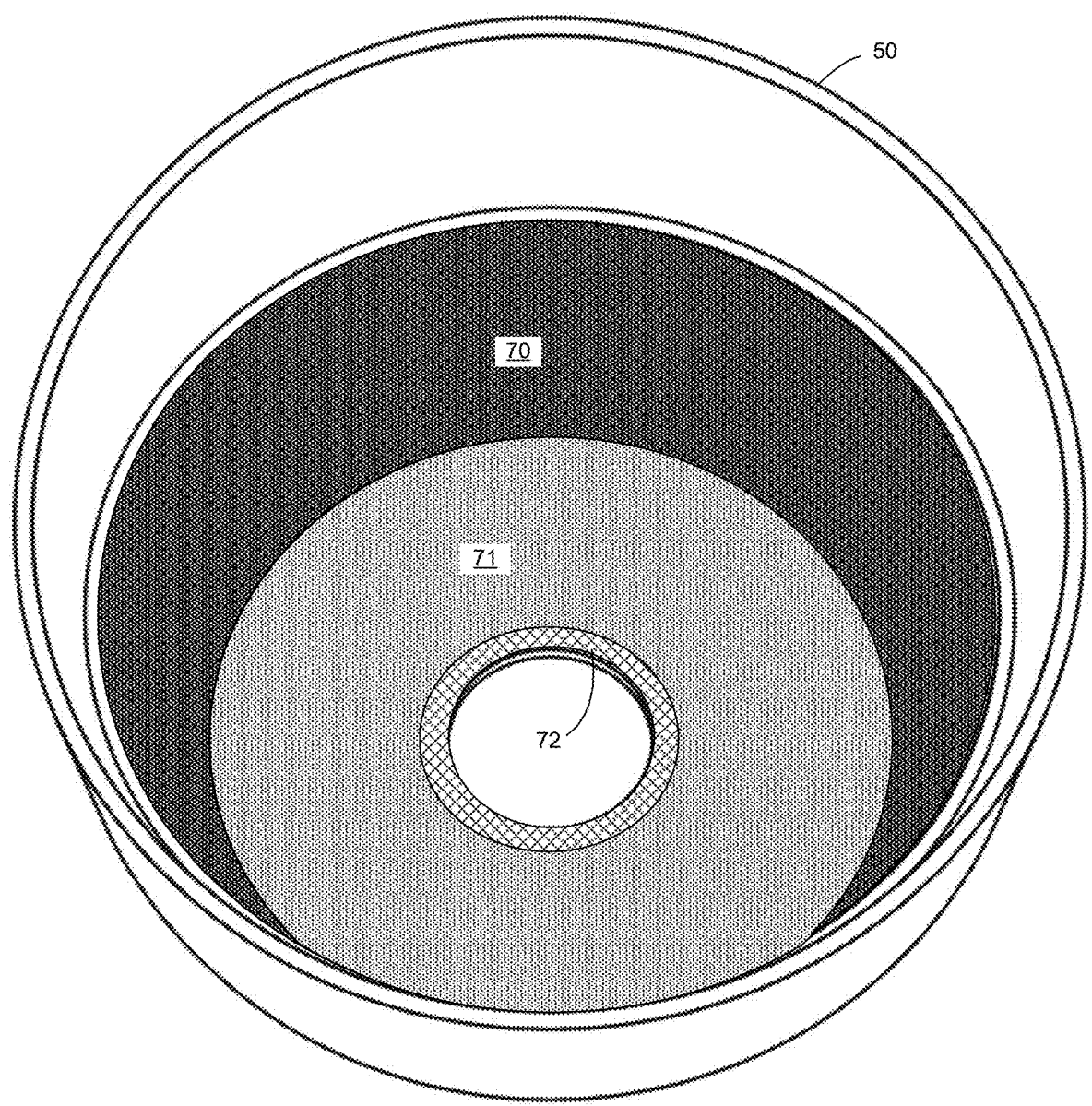
FIG. 19 is a perspective diagram of the cylinder structure 50.

FIG. 19 is a perspective diagram of the cylinder structure 50. The cylindrical structure 50 is employed when the faceted structure imaging assembly 36 is configured in the second mode. The first color feature 70 has a green color and extends along lateral inner surface 54 of the cylinder 50. The second color feature 71 is a red color and extends in a circular, doughnut-like fashion around an upper interior surface 54 of the cylinder 50. The third color feature 72 has a blue color and extends in a circular doughnut-like fashion around an upper inner surface 54 of the cylinder 50. The second color feature 71 entirely surrounds the third color feature 72. It is understood that additional color features could be added in order to distinguish between light entering the faceted structure 11 from different angular ranges. Providing additional color features would provide additional spectral resolution.

Figure 20:
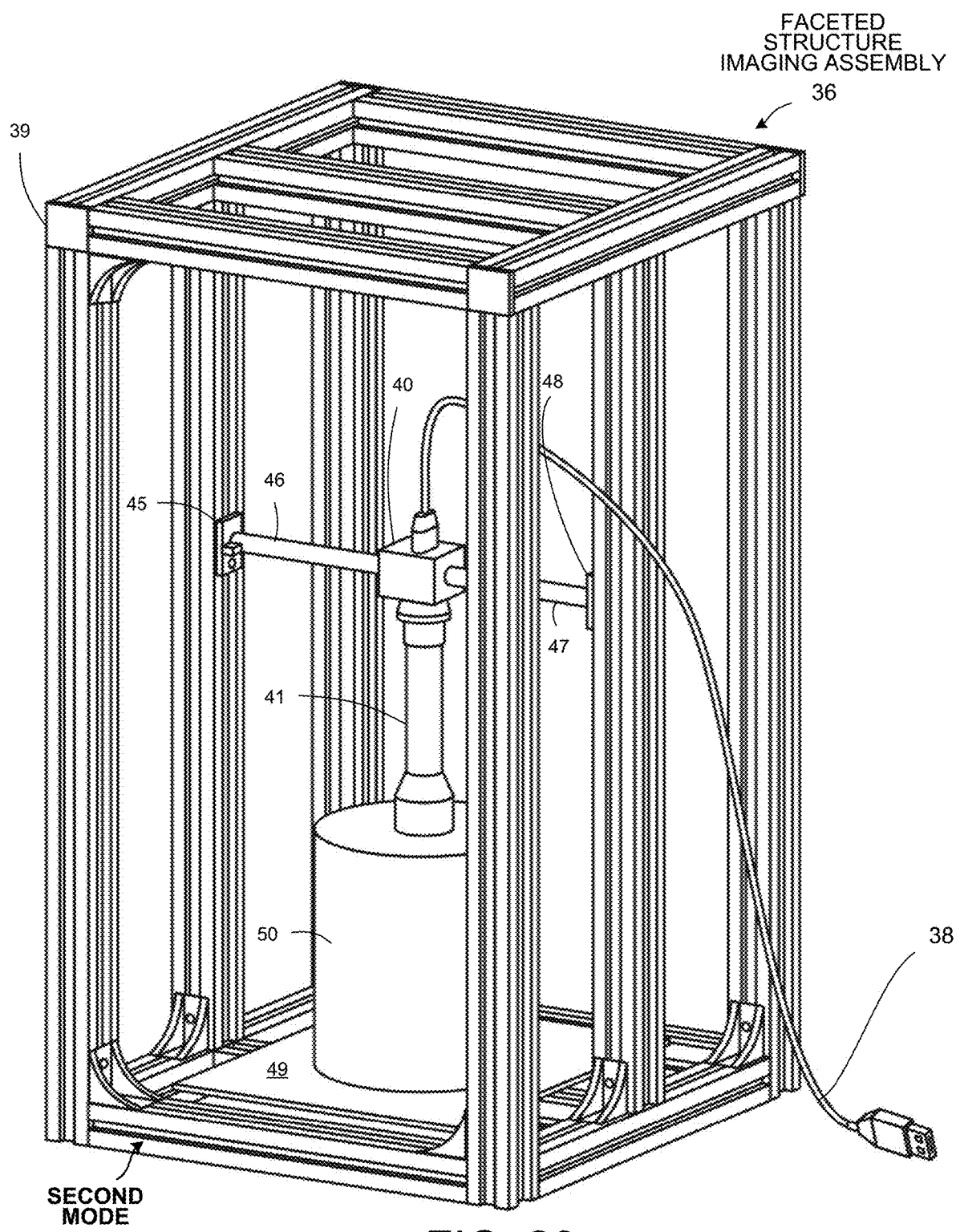
FIG. 20 is a diagram of a perspective view of the faceted structure imaging assembly 36 in the second mode.

FIG. 20 is a diagram of a perspective view of the faceted structure imaging assembly 36 in the second mode. The cylinder 50 covers and entirely surrounds the faceted structure holder 42. The imaging aperture 63 (not visible in FIG. 20) at the top of cylinder 50 provides an opening so that the image sensor 40 can capture an image of the upper surface of the faceted structure 11 through the telecentric lens 41. The light source 44 reflects light up through the cylinder as described and shown in FIGS. 17 and 18.

Figure 21:
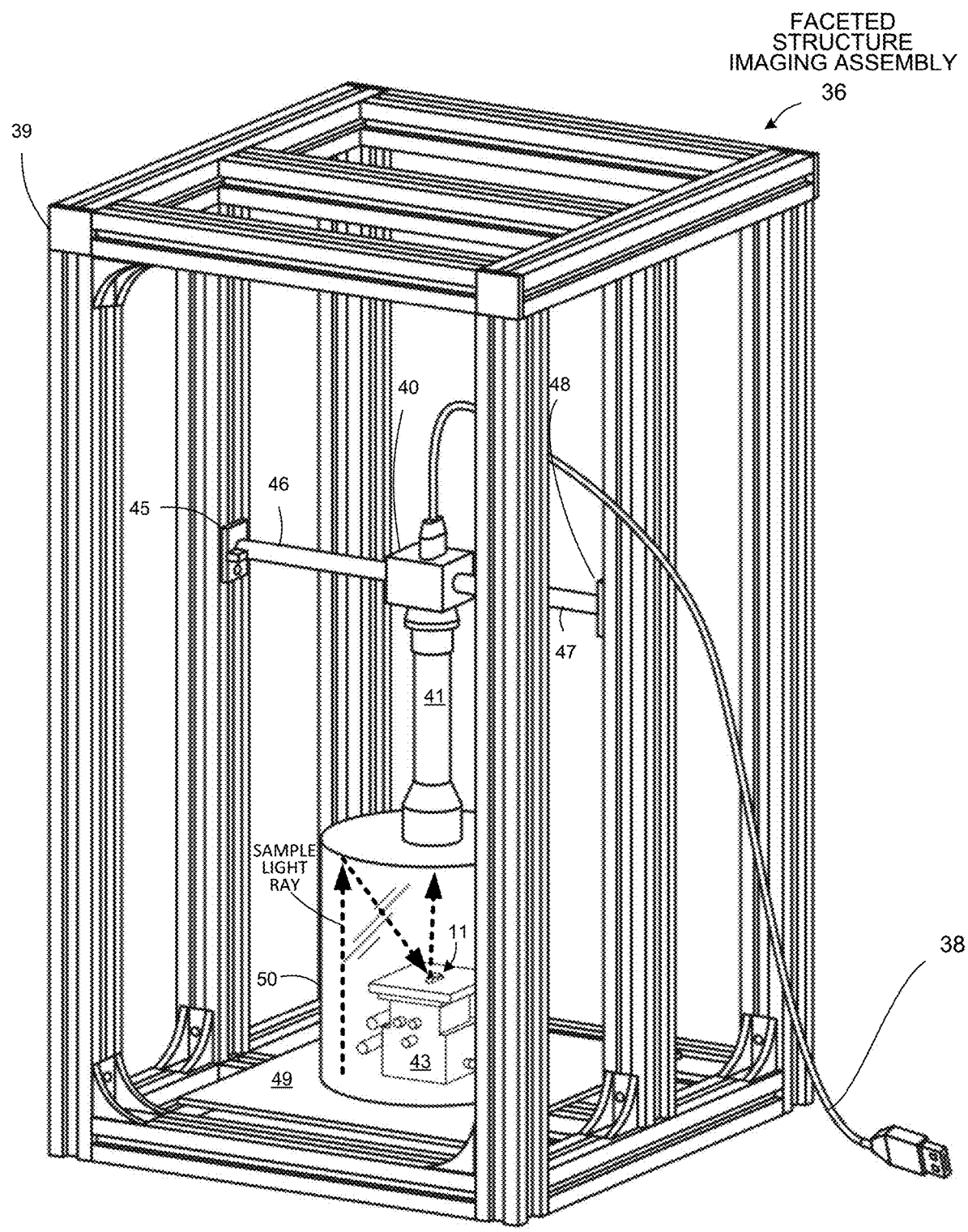
FIG. 21 is a diagram that shows another perspective view of the faceted structure imaging assembly 36 operating in the second mode.

FIG. 21 is a diagram that shows another perspective view of the faceted structure imaging assembly 36 operating in the second mode. The cylinder 50 is shown transparent in FIG. 21 for explanatory purposes. It is understood that cylinder 50 is not, however, transparent. Cylinder 50 is solid, prevents light from escaping the inner surface 54 of the cylinder 50, and reflects colored light onto the faceted structure 11. Light reflected by the color features 56 on the inner surface 54 of cylinder 50 is captured by the image sensor 40. The different colors provide angular spectrum information of the faceted structure 11. Dotted lines and arrows show how a sample light ray is reflected within the cylinder 50.

Figure 22:
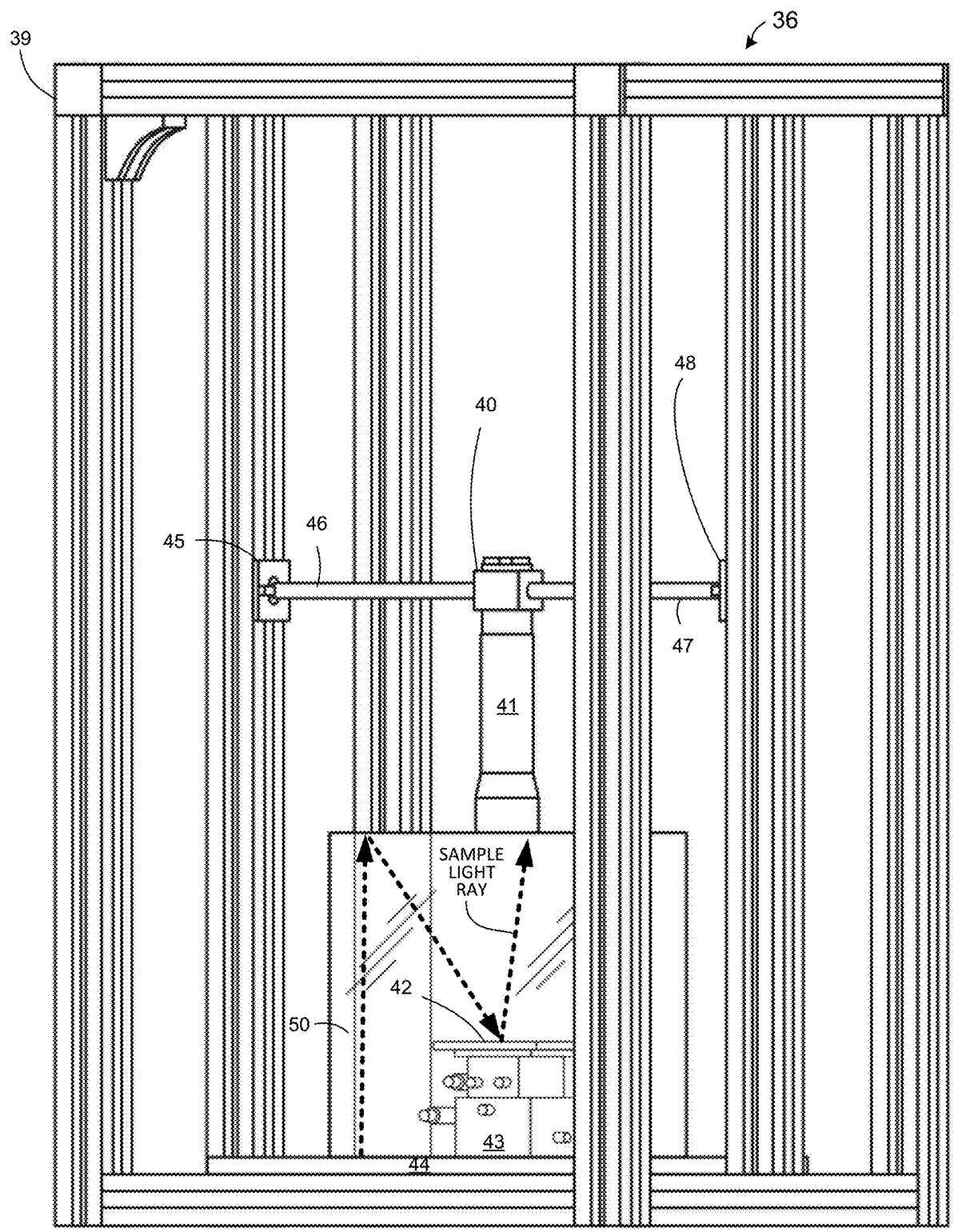
FIG. 22 is a diagram showing a front view of the faceted structure imaging assembly 36.

FIG. 22 is a diagram showing a front view of the faceted structure imaging assembly 36. Cylinder 50 is also shown transparent in FIG. 22 for explanatory purposes. It is understood that cylinder 50 is not transparent. Dotted lines and arrows show how a sample light ray is reflected within the cylinder 50.

FIG. 23 is a diagram of angular spectrum information 96 that is captured and generated by the image sensor 40. Angular spectrum image 96 is also referred to as an Angular Spectrum Evaluation Tool (ASET) image. Light that enters the faceted structure 11 and that is then redirected to aperture 63 at the top center of the cylinder 50 uses color to differentiate angle of entry. The angular spectrum information is usable to obtain structure and dimension information of the faceted structure 11.

Figure 24:
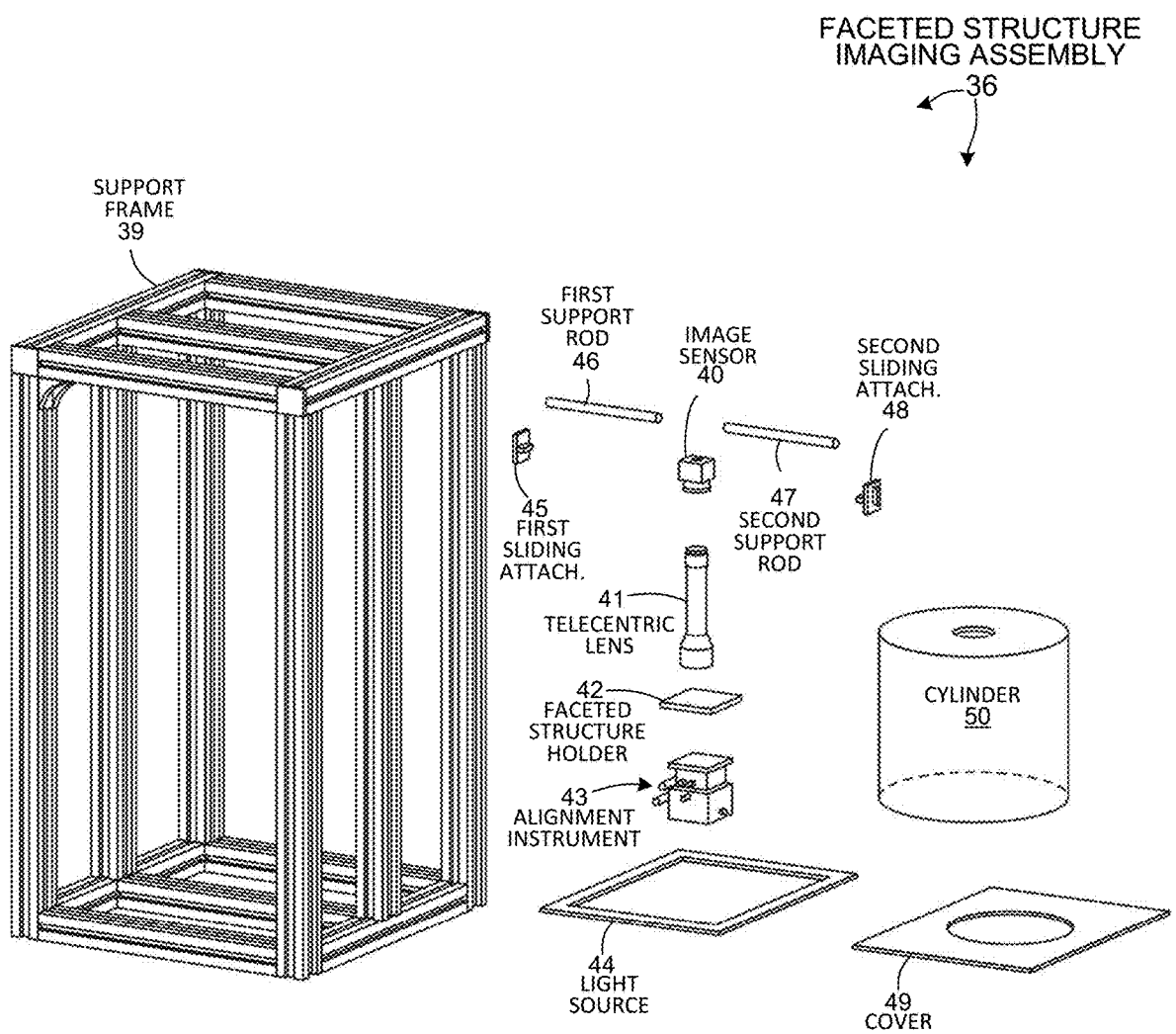
FIG. 24 is a diagram showing an exploded view of the faceted structure imaging assembly 36.

FIG. 24 is a diagram showing an exploded view of the faceted structure imaging assembly 36. The telecentric lens 41 is available from Edmund Optics located at 6274 E. Grant Rd., Tucson, Ariz. 85712 at the following webpage: https://www.edmundoptics.com/p/040x-silvertl-telecentric-lens/13651/. The image sensor 40 is available from Edmund Optics located at 6274 E. Grant Rd., Tucson, Ariz. 85712 at the following webpage: https://www.edmundoptics.com/p/eo-10012ccmos-color-usb-camera/22777/. The alignment instrument 43 is also referred to as a translation stage device and is available from Banggood located at Baiyun Park, Guangzhou, China and available from the following webpage: https://us.banggood.com/Wholesale-Warehouse-60×60 mm-XYZ-3-Axis-Linear-Stage-Adjustable-Manual-Displacement-Platform-Sliding-Table-wp-Usa-1105874.html. The light source 44 is also referred to as an LED light box trace and is available from LitEnergy located at 401 N. Terry Ave., North Seattle, Wash. 98109 and available from the following webpage: https://www.amazon.com/Portable-LITENERGY-Artcraft-Sketching-Animation/dp/B07F147VF6/ref=asc_df_B07F147VF6/. The support frame 39 is available from Misumi located at 1717 Penny Lane, Schaumburg, Ill. 60173 and available from the following webpage: https://us.misumi-ec.com/contents/company/.

Figure 25:
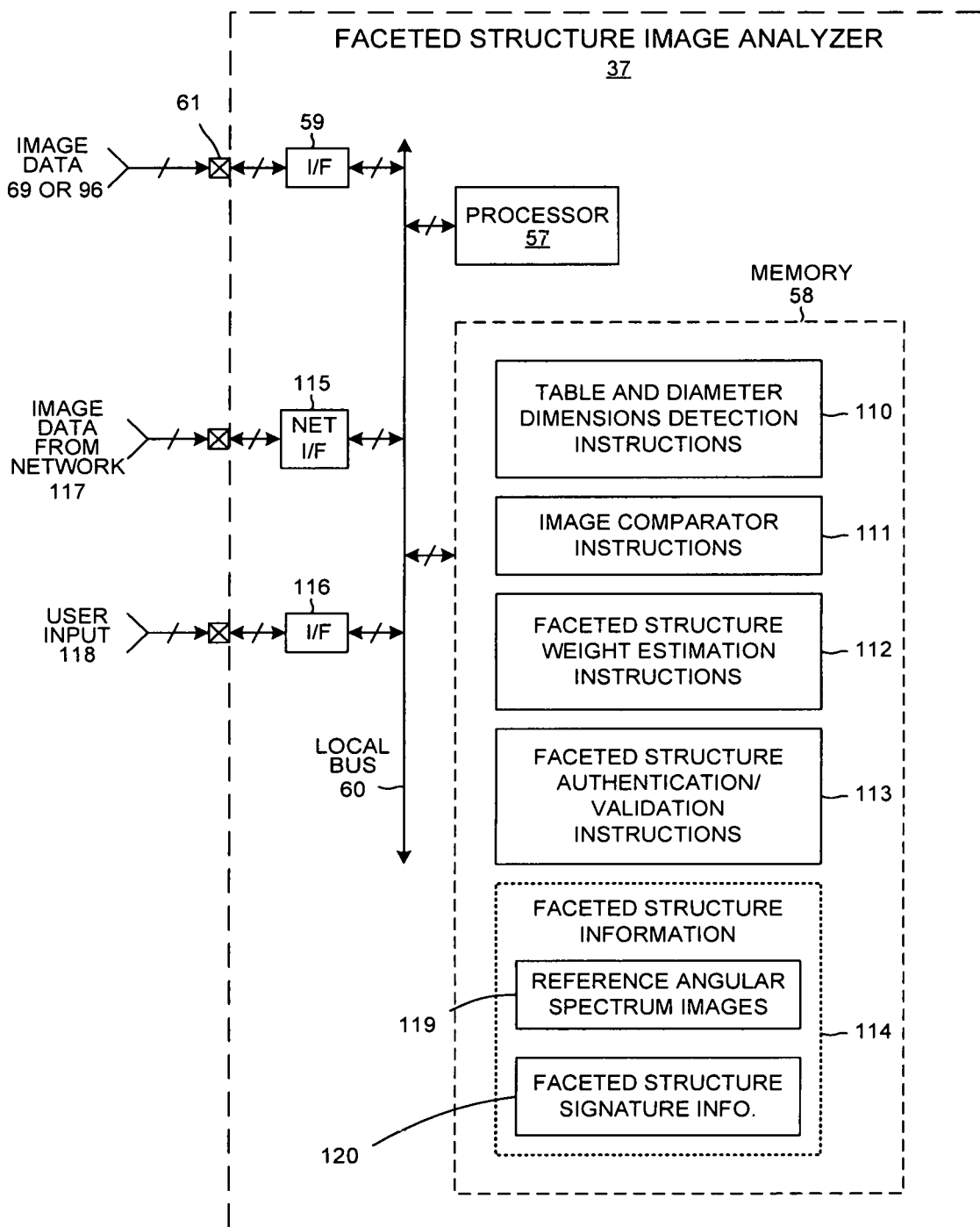
FIG. 25 is a more detailed block diagram of the faceted structure image analyzer 37.

FIG. 25 is a more detailed block diagram of the faceted structure image analyzer 37. The faceted structure image analyzer 37 receives image data from the faceted structure imaging assembly 36 via terminal 61. Processor 57 uses the image data to estimate weight of the faceted structure 11 and to perform validation of the faceted structure 11. The faceted structure image analyzer 37 comprises a processor 57, the memory 58, the interface 59, a network interface 115, an input interface 116, and the local bus 60. The memory 58 stores table and diameter dimensions detection instructions 110, image comparator instructions 111, faceted structure weight estimation instructions 112, faceted structure authentication/validation instructions 113, and faceted structure information 114. The faceted structure information 114 includes reference angular spectrum images 119 and faceted structure signature information 120. Network interface 115 is configured to receive image data across a network 117. Input interface 116 is configured to receive user input 118.

Figure 26:
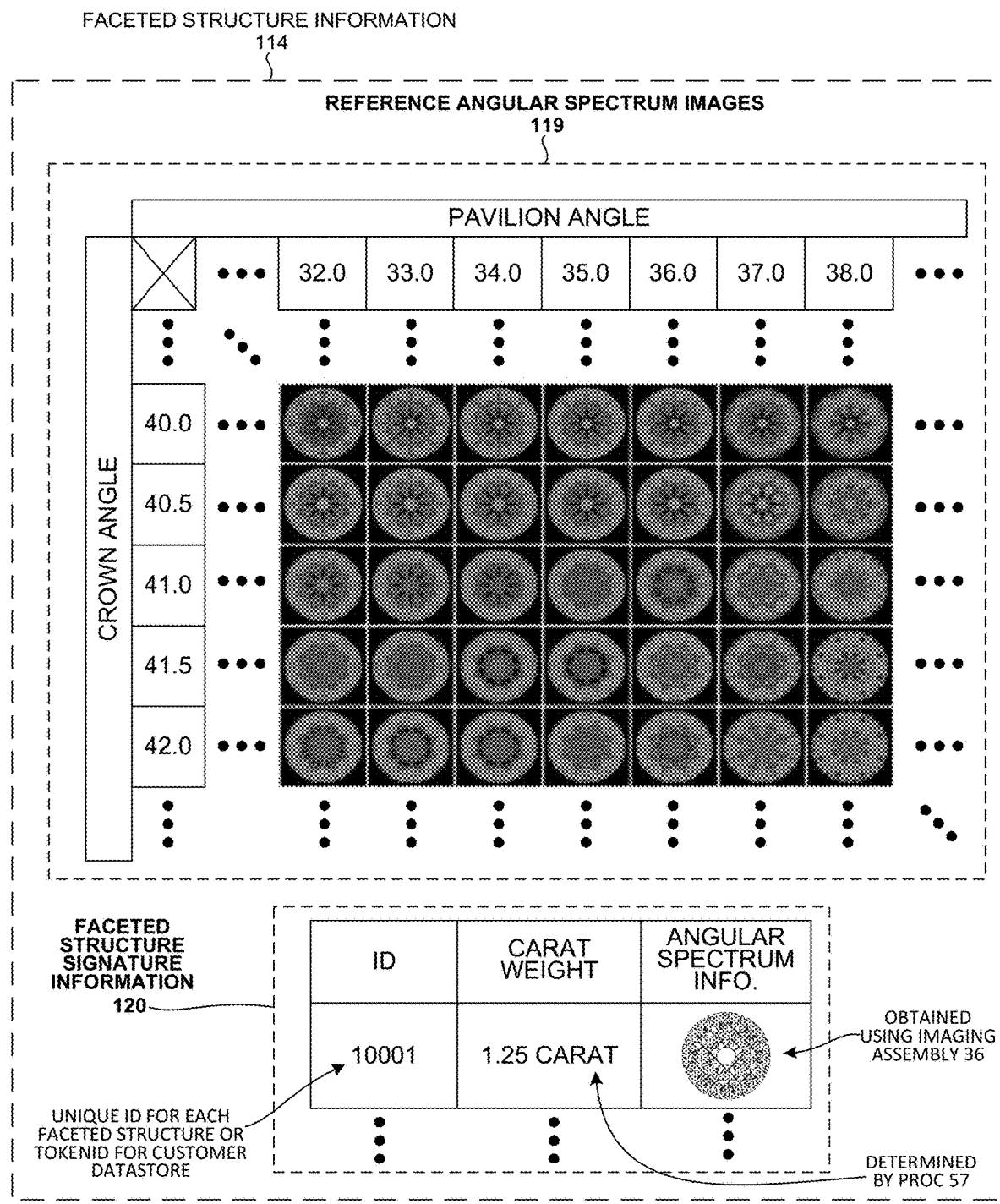
FIG. 26 is a diagram of the faceted structure information 114 that is stored in memory 58.

FIG. 26 is a diagram of the faceted structure information 114 that is stored in memory 58. The reference angular spectrum images 119 and the faceted structure signature information 120 are stored in memory 58 of the faceted structure image analyzer 37. Each of the reference angular spectrum images 119 has a corresponding pavilion angle and a corresponding crown angle. Images obtained from the faceted structure imaging assembly 36 while in the second mode are used by processor 57 to compare to the reference angular spectrum images 119. Comparing By comparing the obtained images of the faceted structure 11 to the reference angular spectrum images 119, the crown angle and the pavilion angle can be estimated. This is explained in further detail below.

The reference angular spectrum images 119 shown in FIG. 26 can be obtained empirically by testing a plurality of faceted structures with known crown angles and pavilion angles. In one example, this involves obtaining faceted structures, ascertaining the pavilion angle and crown angle of the faceted structure, and capturing an image using image sensor 40 in the second mode. The reference images are stored in the memory 50 along with their corresponding crown angles and pavilion angles as shown in FIG. 26. In another example, the reference angular spectrum images 119 are generated digitally. For example, conventional software. such as DiamCalc, can be used to generate digital images of angular spectrum information for faceted structures with known pavilion angles and crown angles. The generated digital images are stored in memory 58 along with their corresponding crown angles and pavilion angles as shown in FIG. 26. DiamCalc is available from OctoNus Software Ltd located at Office 103, building 3A, Luzhnetskaya naberezhnaya, Moscow 119270, Russia and from the following webpage: http://www.octonus.ru/oct/products/3dcalc/standard/.

The faceted structure signature information 120 is used to validate and authenticate faceted structures. By storing the faceted structure signature information 120, signature information for newly received faceted structures is obtained and then compared to prior obtained faceted structure signature information. The comparing can be performed entirely by processor 57 without user input or in combination with user input.

For example, after a newly received faceted structure is received, the faceted structure imaging assembly 36 is used to obtain a first image in the first mode and a second image in the second mode. Next, carat weight is determined in accordance with the presently disclosed techniques. The carat weight and the angular spectrum information are compared to prior stored signature information. If a match is found, then the newly received faceted structure is validated and authenticated as being previously analyzed by the faceted structure analysis system 35. In one example, the comparison is performed in accordance with the techniques described in connection with FIG. 36, where the reference images are the prior images obtained by the sensor 40. In another example, the comparison involves rotation and overlay of the angular spectrum information until a match is within a certain pixel error tolerance. In another example, the comparison involves an operator reviewing the closest identified prior signature information records against the signature information for the newly obtained faceted structure.

Figure 27:
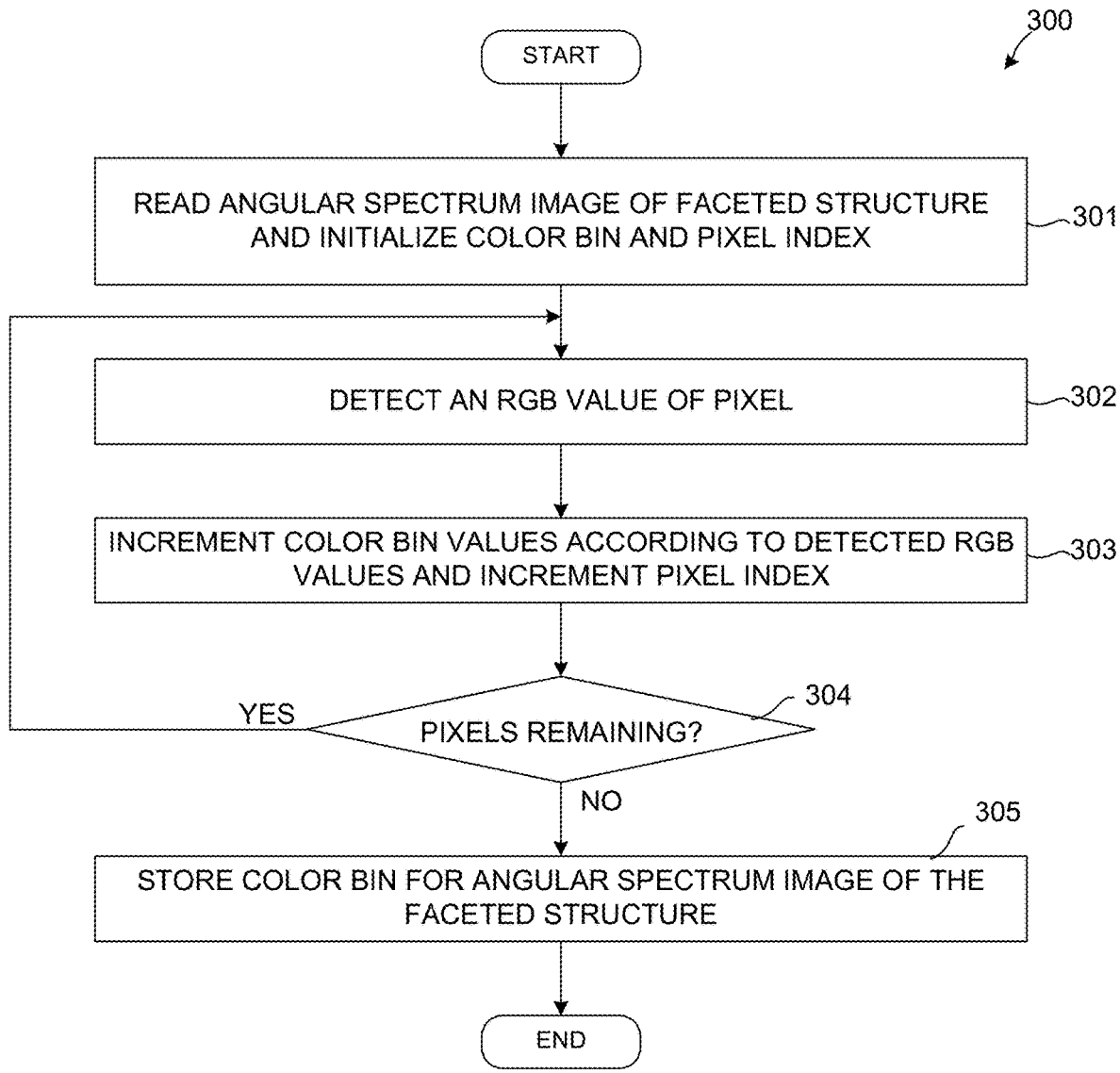
FIG. 27 is a flowchart of a method 300 in accordance with one novel aspect.

FIG. 27 is a flowchart of a method 300 in accordance with one novel aspect. Method 300 is used to generate a color bin for one angular spectrum image of the faceted structure. The color bin is used to compare angular spectrum images of different faceted structures. In a first step (step 301), and angular spectrum image of the faceted structure is read and the color bin and pixel index are initialized. One example of color bin initialization is shown in FIG. 29.

In a second step (step 302), and RGB value of a pixel is detected. One example of RGB value detection of a pixel is shown in FIG. 28.

In the third step (step 303), color bin values according to the detected RGB values are incremented in pixel index is incremented as well. One example of incrementing color bin values according to the detected RGB value is shown in FIG. 28.

The fourth step (step 304), a determination is made as to whether or not additional pixels remain to be analyzed. If it is determined that no additional pixels remain for analysis, then the color bin for the angular spectrum image of the faceted structure is stored in a fifth step (step 305). If, on the other hand, at step 304, it is determined that additional pixels are remaining, then the method proceeds to repeat step 302 where the RGB value is detected and next to step 303 where the color bin values are incremented accordingly. This is cycle is repeated until all pixels have been analyzed.

Figure 28:
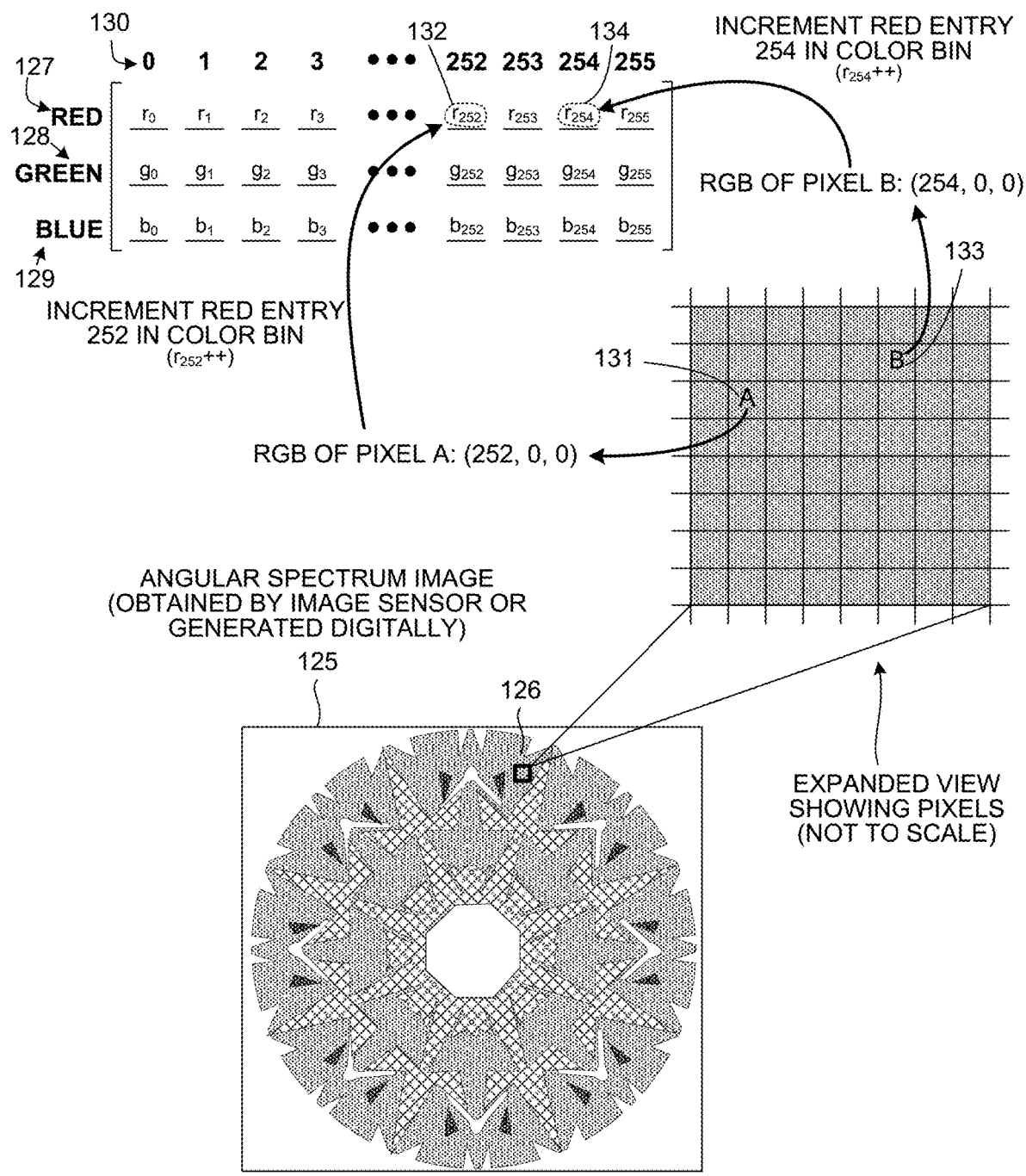
FIG. 28 is a diagram that shows how the RGB values are detected and how the color bin operation is performed for each pixel in the image.

FIG. 28 is a diagram that shows how the RGB values are detected and how the color bin operation is performed for each pixel in the image. The operations shown in FIG. 28 are performed at step 302 and step 303 of the method 300 shown in FIG. 27. Each pixel of the angular spectrum image 125 is detected and analyzed. Area 126 is an expanded view of a set of pixels of the angular spectrum image 125. The expanded view of area 126 is not drawn to scale but is shown in FIG. 28 for explanatory purposes to explain how the color bin is incremented. The color bin data structure is shown the top left of FIG. 28. The color bin structure has columns 130 representing RGB values from 0 to 255. This represents the range of possible values for each RGB value of a pixel. The color bin structure has three rows including a red row 127, a green row 128, and a blue row 129. Each pixel of the angular spectrum image 125 is traversed. For example, pixel 131 labeled A in FIG. 28, has an RGB value of (252, 0, 0). The entry at red row 127 and column 252 is incremented. Pixel 133 labeled B in FIG. 28 has an RGB value of (254, 0, 0). The entry at red row 127 and column 254 is incremented. The color bin structure is one representation of the overall color of the angular spectrum image 125. The color bin structure is used to compare color composition of one angular spectrum image to color composition of another angular spectrum image.

FIG. 29 is a diagram that shows the color bin structure 135 upon initialization. Each entry in the color bin structure 135 is initialized to a zero value.

FIG. 30 shows a color bin structure 136 of the captured image. The color bin 136 is generated for each captured image that is obtained by the image sensor 40.

FIG. 31 is a diagram that shows color bin structures for each reference image. In one example, there are six-hundred and sixteen (616) reference images that are stored in memory 58. Each reference image has its own color bin that represents the color composition of the reference image. Reference numeral 137 identifies color bin for reference image R1. Reference numeral 138 identifies color bin for the reference image R616.

FIG. 32 is a diagram that shows a sum of absolute difference (SAD) operation performed between the image obtained by image sensor 40 and each reference image. The SAD operation involves finding the absolute magnitude difference between each entry of the color bin for each reference image and each entry of the color bin of the obtained image. The result of each SAD operation is a single scalar value. Reference numeral 139 identifies the SAD operation involving the color bin 136 for the obtained image and the reference color bin 137 of reference image R1. Reference numeral 140 identifies the SAD operation involving the color bin 136 for the obtained image and the reference color bin 138 of reference image R616.

FIG. 33 is a diagram of a matrix 141 having three columns that shows the resulting SAD operation for each reference image along with the corresponding crown angle and pavilion angle. The first column 142 has the SAD operation values between the obtained image and each reference image. The second column 143 includes the crown angles for the corresponding reference image. The third column 144 shows the pavilion angle for the corresponding reference image.

FIG. 34 is a diagram that shows a result of a sort operation of matrix 141 of FIG. 33. The values at the top of the matrix 145 identify the reference images that match closest in color to the obtained image. The entries at the bottom of matrix 145 represent the reference images that are least similar in color to the obtained image.

Figure 35:
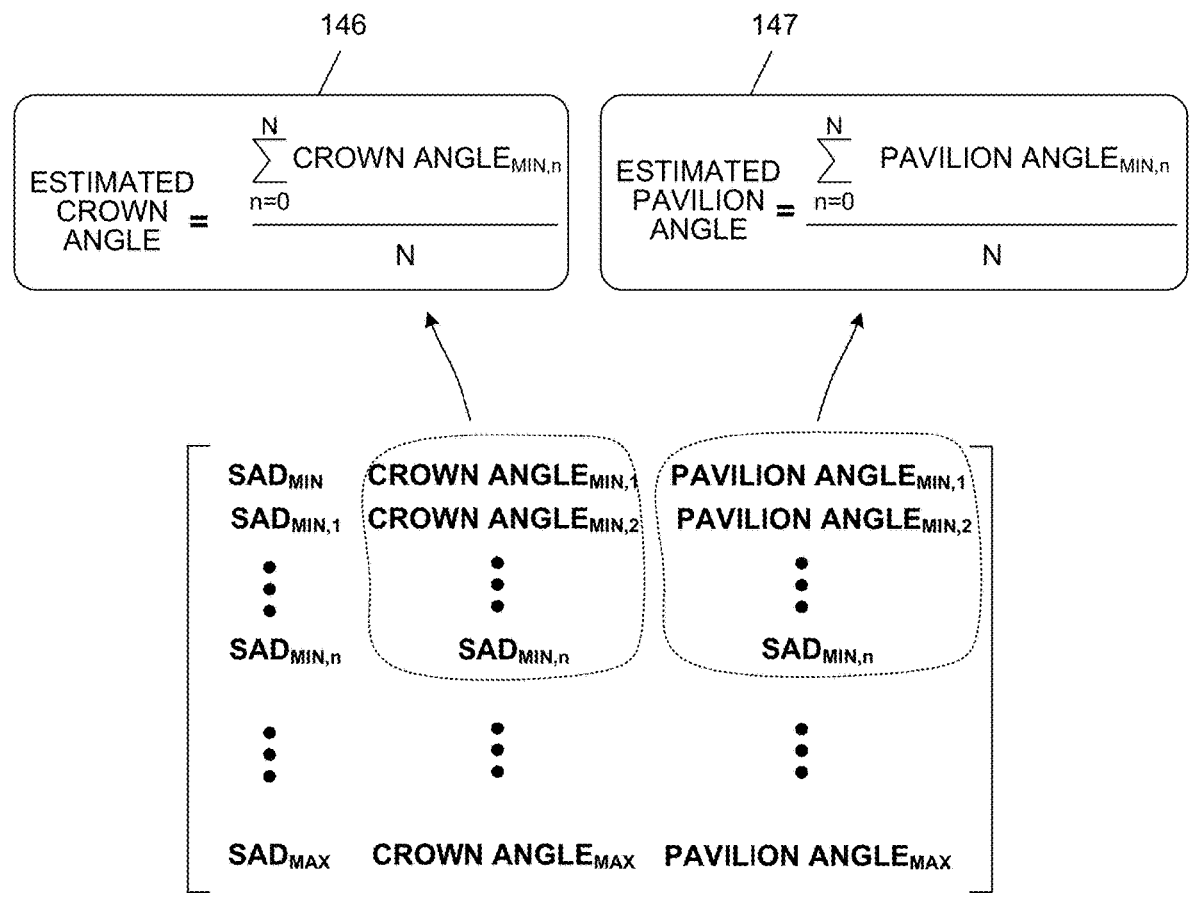
FIG. 35 is a diagram that shows how the crown angle and the pavilion angle is estimated using matrix 145.

FIG. 35 is a diagram that shows how the crown angle and the pavilion angle is estimated using matrix 145. To obtain an estimation of the crown angle, the top N-entries of the crown angle from column 143 are averaged together. This is identified by reference numeral 146. To obtain an estimation of the pavilion angle, the top N-entries of the pavilion angle from column 144 are averaged together. This is identified by reference numeral 147. In one example, N is equal to twenty (20). By comparing the image obtained by image sensor 40 to the reference images with known crown and pavilion angles, the crown and pavilion angles of the captured image of the faceted structure can be estimated.

FIG. 36 is a flowchart of a method 400 in accordance with another novel aspect. Method 400 is illustrated in FIGS. 30 through 35. In a first step (401), angular spectrum information of a faceted structure is obtained. For example, an image of a faceted structure is obtained by the faceted structure imaging assembly in the second mode.

In a second step (step 402), the obtained angular spectrum information of the faceted structure is compared to reference angular spectrum information. For example, for each reference image, a SAD operation is performed between a color bin of the obtained image and color bins of the reference images to obtain SAD values.

In a third step (403), match information between the obtained image and the reference images is identified. For example, SAD values are sorted in ascending order.

In a fourth step (step 404), at least one dimension of the faceted structure is determined from the match information. For example, crown and pavilion angles of the reference images with the lowest SAD values are averaged together.

Figures 37A, 37B, 37C:
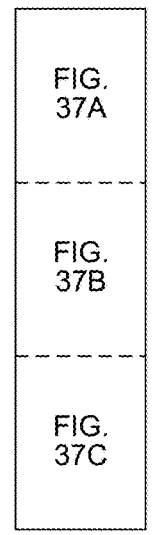
FIGS. 37A, 37B, and 37C, together form FIG. 37 which shows an amount of instructions 148 for comparing captured images with the reference angular spectrum images.

FIGS. 37A, 37B, and 37C, together form FIG. 37 which shows an amount of instructions 148. When executed by the processor 57, the amount of instructions 148 cause the image captured by image sensor 42 to be compared with the reference angular spectrum images 119 stored in memory 58. The result of executing instructions 148 is obtaining the crown and pavilion angles as illustrated in FIGS. 30-36.

Figure 38:
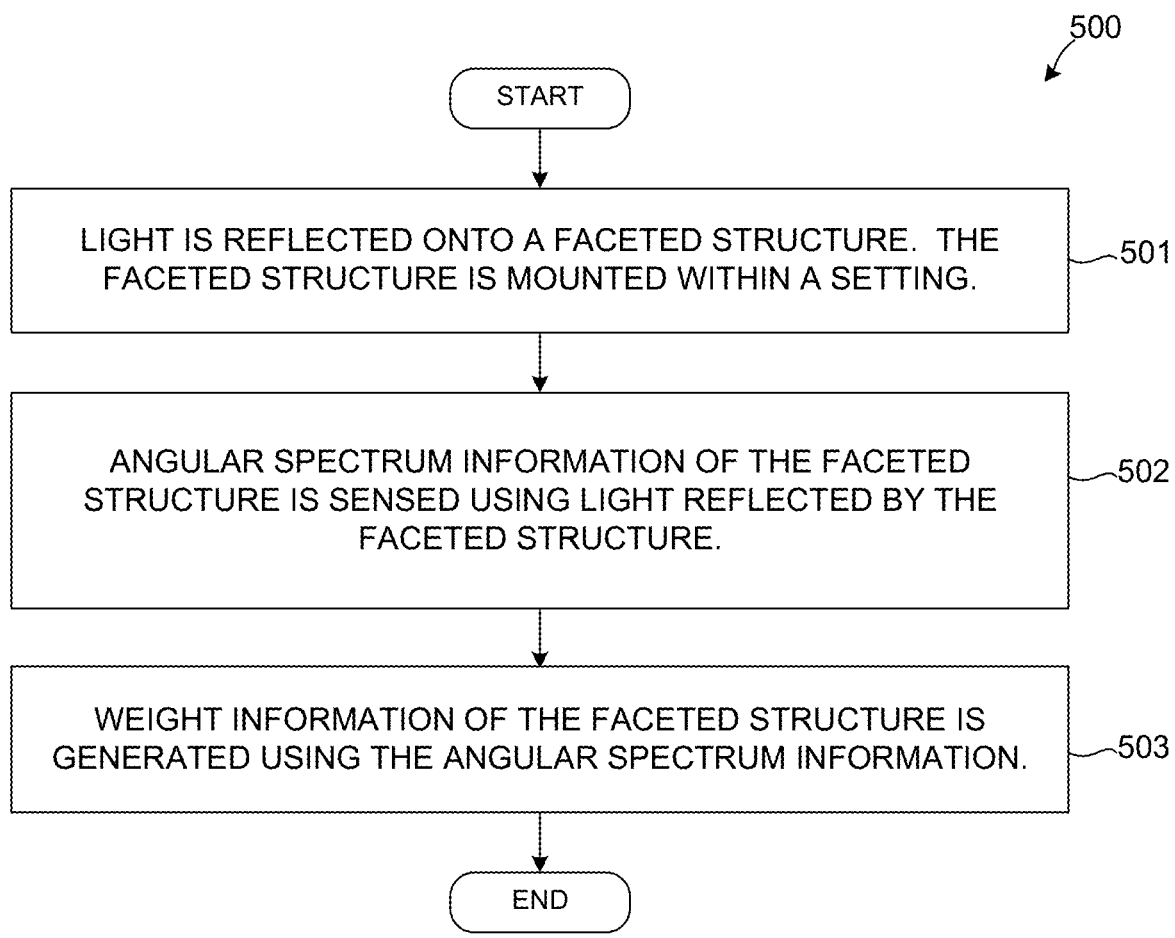
FIG. 38 is a flowchart of a method 500 in accordance with another novel aspect.

FIG. 38 is a flowchart of a method 500 in accordance with another novel aspect. In a first step (step 501), light is reflected onto a faceted structure. The faceted structure is mounted within a setting. For example, the faceted structure is a gemstone such as a diamond that is mounted within an item of jewelry such as a ring.

In the second step (step 502), angular spectrum information of the faceted structure is sensed using the light reflected by the faceted structure. For example, the faceted structure imaging assembly 36 is configured in the second mode. Cylinder 50 covers the faceted structure that is retained by the faceted structure holder 42. Light source 44 is activated thereby causing white light to be reflected from the color features 56 of the cylinder 50 and reflected onto the faceted structure 11. The faceted structure 11 in turn reflects light onto the detection aperture 63 at the top of the cylinder 50. The different color light entering the faceted structure 11 corresponds to different angles of entry. The color light that is redirected to aperture 63 and captured by image sensor 40 represents angular spectrum information of the faceted structure 11.

In a third step (step 503), weight information of faceted structure is generated using the angular spectrum information. For example as shown in FIG. 4, the processor 57 determines the crown angle 30 and pavilion angle 31 by comparing the angular spectrum information of the faceted structure to reference angular spectrum information that is stored in the memory 58. As shown in the weight estimation equation of FIG. 4, the crown angle 30 and pavilion angle 31 are used to determine the depth 27. Depth 27 is then used to determine the weight of the faceted structure.

Figure 39D:
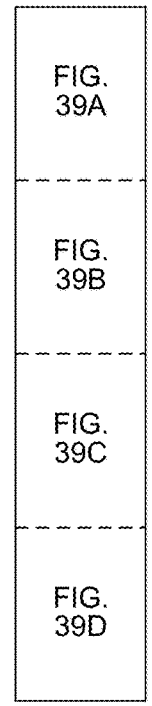

FIGS. 39A, 39B, 39C, and 39D together form FIG. 39 which is an amount of instructions 150. The amount instructions 150 when executed by the processor 57 cause the weight of the faceted structure to be estimated.

Figure 40:
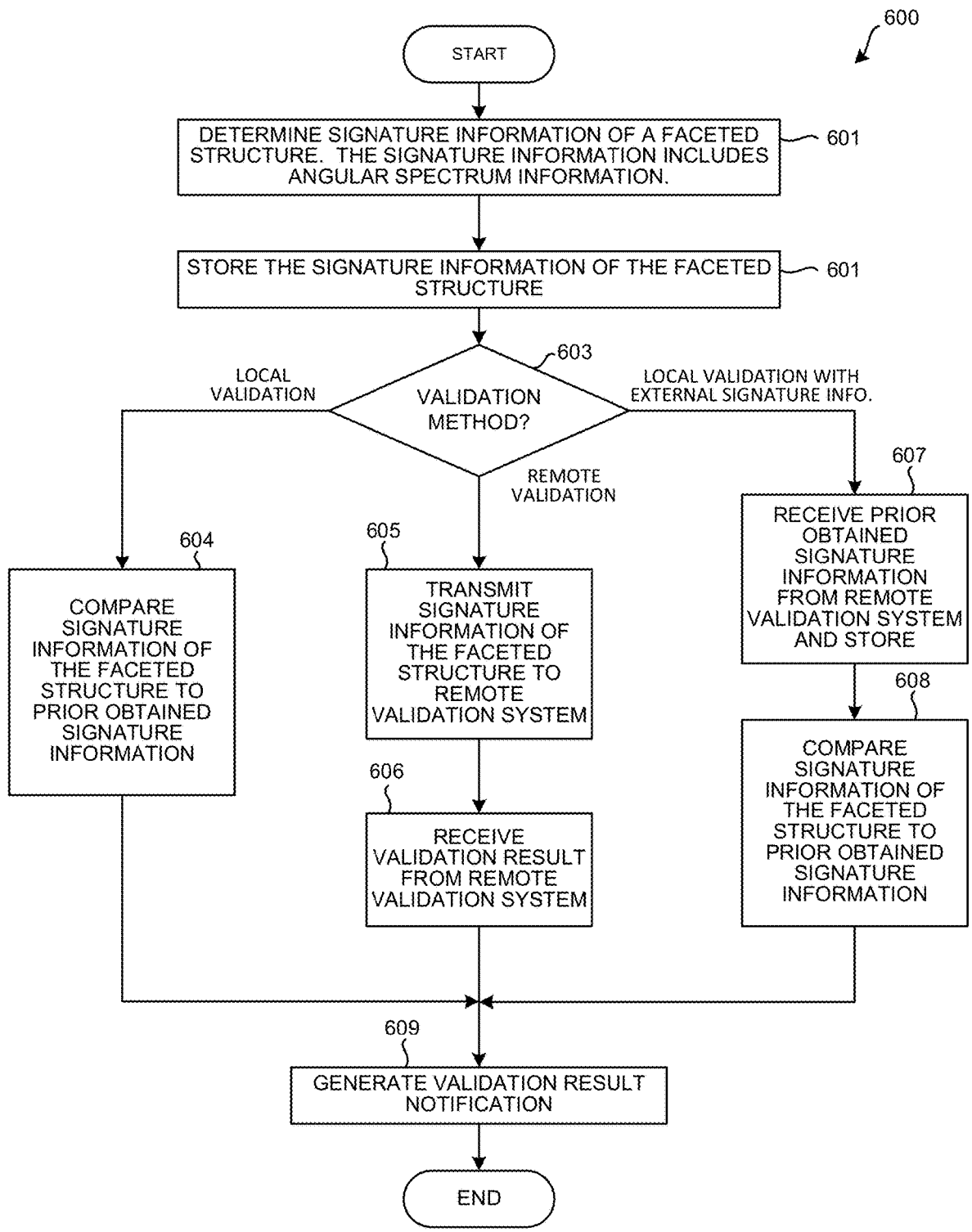
FIG. 40 is a flowchart of a method 600 in accordance with another novel aspect.

FIG. 40 is a flowchart of a method 600 in accordance with another novel aspect. In a first step (step 601), signature information of the faceted structure is determined. The signature information includes angular spectrum information. In one example, angular spectrum information is obtained by using the faceted structure imaging assembly 36 in the second mode.

In a second step (step 602), signature information of the faceted structure is stored. In one example, signature information includes angular spectrum information that is obtained by the faceted structure imaging assembly 36 in memory 58.

In a third step (step 603), a determination is made as to which validation method to use. In the event that it is determined that validation is to be performed locally, then method 600 proceeds to step 604. At step 604, signature information of the faceted structure as compared to prior obtained signature information. If, on the other hand, it is determined at step 603 that validation is to be performed remotely, then method 600 proceeds from step 603 to steps 605 and 606. At step 605, signature information of the faceted structure is transmitted to the remote validation system. Next, at step 606, a validation result is received from the remote validation system. If, on the other hand, it is determined at step 603 that validation is to be performed locally with external signature information, then method 600 proceeds from step 603 to steps 607 and 608. At step 607, prior obtained signature information is received from the remote validation system and stored locally. Next, at step 608, signature information of the faceted structure is compared to the received prior obtained signature information.

After one of the three validation steps are performed, either step 604, steps 605 and 606, or steps 607 and 608, the method 600 proceds to step 609 where the validation result notification is generated. Local validation (step 604) is shown in more detail with respect to FIG. 41. Remote validation (steps 605 and 606) is shown in more detail with respect to FIG. 42. Local validation with external signature information (steps 607 and 608) is shown in more detail in FIG. 43.

Figure 41:
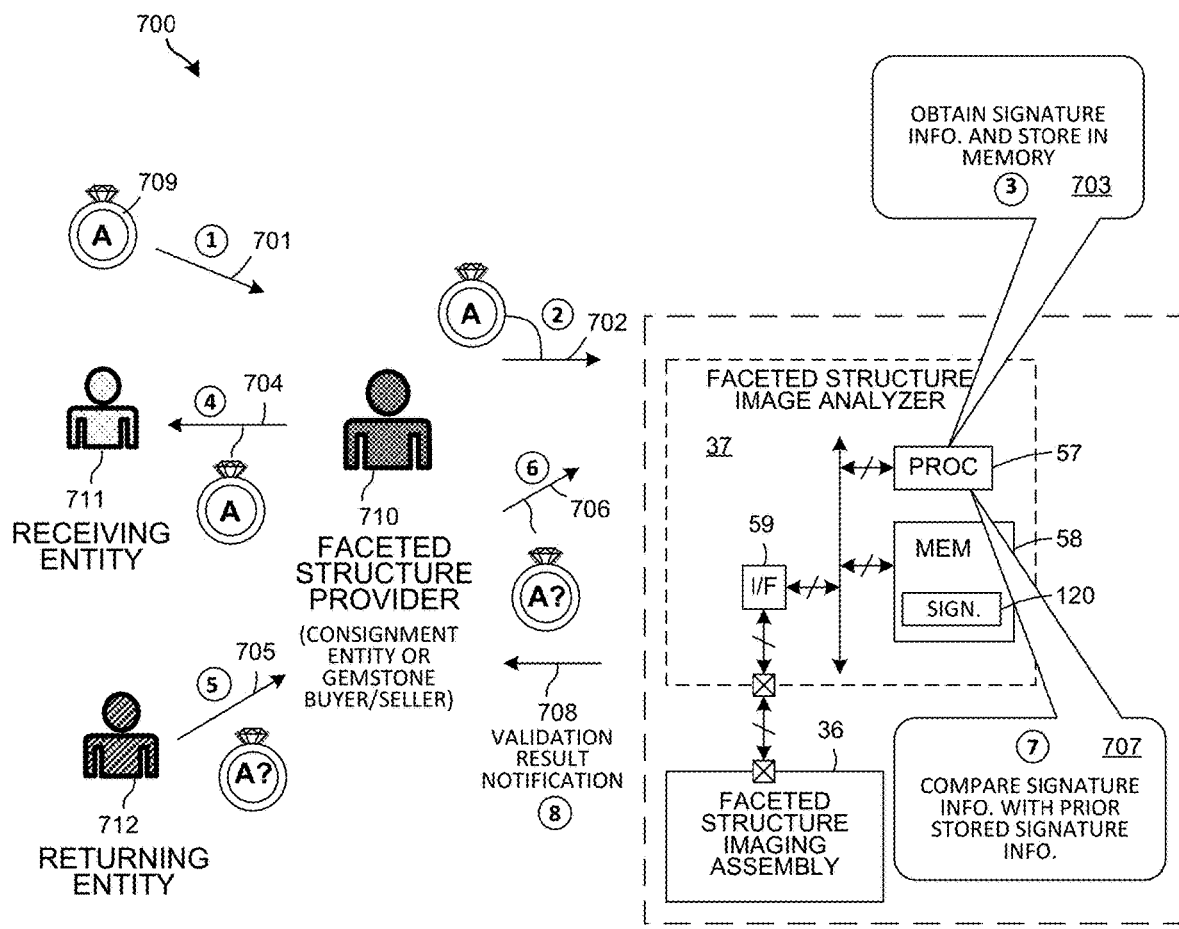
FIG. 41 is a diagram that shows one embodiment of a method 700 of how local validation is performed in method 600 of FIG. 40.

FIG. 41 is a diagram that shows one embodiment of a method 700 of how local validation is performed in method 600 of FIG. 40. At 701, the faceted structure 709 is received by the faceted structure provider 710. The faceted structure provider 710 is a consignment entity, a gemstone buyer, or gemstone seller, or another type of entity that transfers, receives, or deals in gemstones or other faceted structures. At step 702, the faceted structure 709 is processed by the faceted structure analysis system 35. The faceted structure imaging assembly 36 is used to obtain signature information of the faceted structure 609. The signature information includes angular spectrum information. At step 703, the obtain signature information is stored in memory 58. At step 704, faceted structure 709 is transferred to receiving entity 711. At some point later in time, returning entity 712 attempts to return the faceted structure at step 705. At step 705, the faceted structure provider 710 is to determine whether or not the faceted structure received is the same as the faceted structure 709 that was provided to receiving entity 711. At step 706, the faceted structure is analyzed by the faceted structure analysis system 35. Processor 57 compares the signature information with prior stored signature information at step 707. At step 708, a validation result notification is generated. The validation result notification indicates whether or not the return faceted structure returned by a returning entity 712 is the equivalent faceted structure that was provided to the receiving entity 711.

Figure 42:
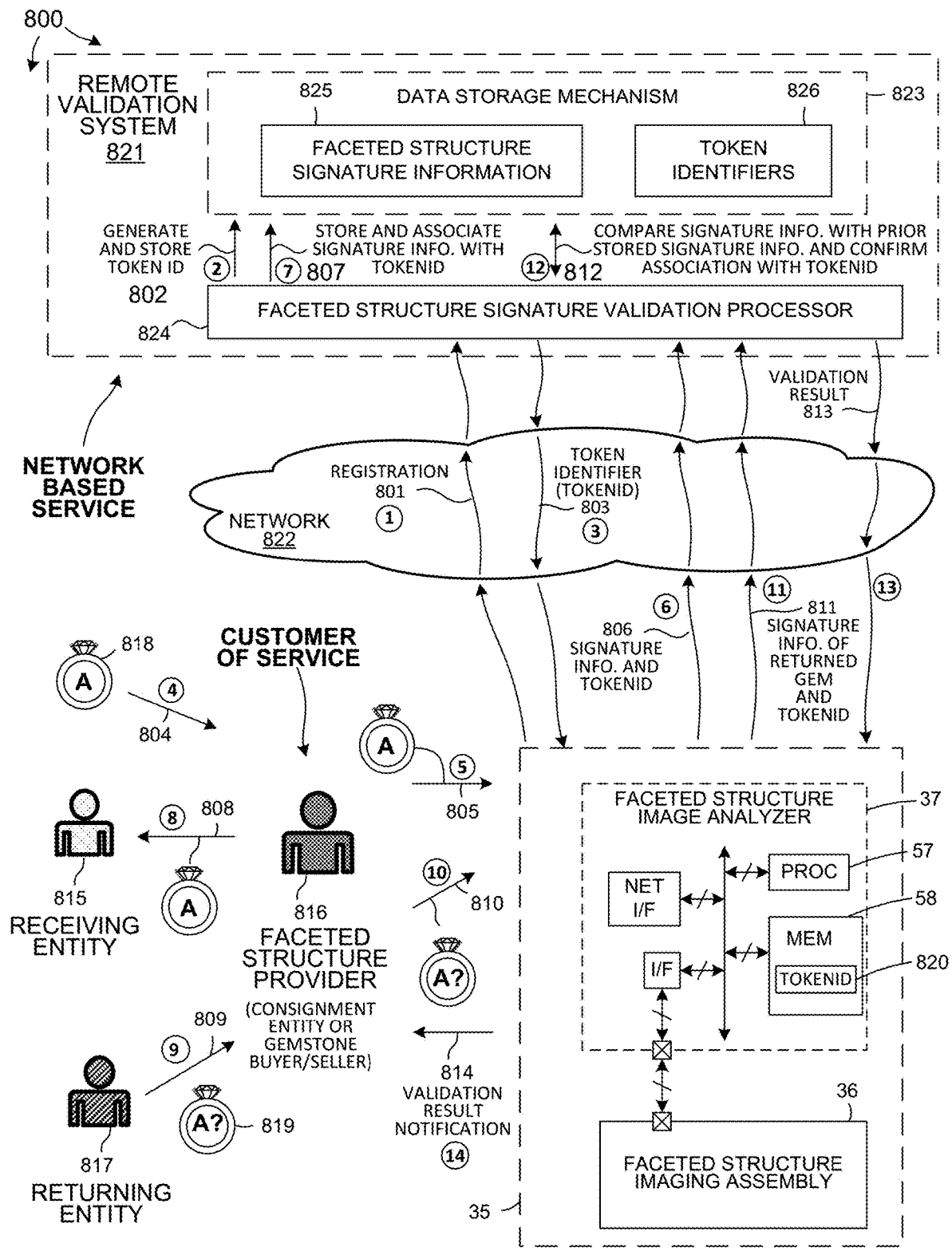
FIG. 42 is a diagram that shows one embodiment of a method 800 of remote validation shown in method 600 of FIG. 40.

FIG. 42 is a diagram that shows one embodiment of a method 800 of remote validation shown in method 600 of FIG. 40. In a first step 801 faceted structure provider 816 registers with a remote validation system 821. The remote validation system 821 is a network-based service. The faceted structure provider 816 is a customer of that network-based service.

Remote validation system 821 includes the data storage mechanism 823 and the faceted structure signature validation processor 824. In one example, the data storage mechanism 823 and the faceted structure signature validation processor 824 are distributed across various network devices and do not reside on a single server. In another example, the data storage mechanism 823 and the faceted structure signature validation processor 824 are operating on a single server. In yet another example, the data storage mechanism 923 and the faceted structure signature validation process 924 are realized in a serverless architecture.

Upon registration, the remote validation system 821 generates and stores token ID at step 802. The generated and stored token ID is used to identify the faceted structure provider 816. The data storage mechanism 823 includes faceted structure signature information 825 and token identifiers 826. Each customer of the network-based service has a different and unique token identifier. Each customer is able to store faceted structure signature information with the remote validation system 821. At step 803, the generated token identifier is communicated from the network-based service from a validation system 821 across the network 822 and to the faceted structure analysis system 35. The token ID 820 is stored in the memory 58.

At step 804, a faceted structure 819 is received by the faceted structure provider 816. At step 805, the received faceted structure 818 is analyzed by the faceted structure analysis system 35. The faceted structure imaging assembly 36 is used to obtain signature information of the faceted structure 818. The signature information includes angular spectrum information and possibly other information about the faceted structure such as dimensions and geometry information. Processor 57 communicates the signature information to the remote validation system 821 at step 806. The signature information and token ID 820 are received by the remote validation system 821. At step 807, remote validation system 821 stores the signature information received from the faceted structure provider 816 and associates the received signature information with the token ID 820. At step 808, the faceted structure provider 816 provides the faceted structure 818 to a receiving entity 815.

At some point later in time a returning entity 817 attempts to return faceted structure 819 at step 809 to the faceted structure provider 816. Faceted structure 816 is to make a determination as to whether or not the returned faceted structure 819 is equivalent to the faceted structure 818 that was provided to the receiving entity 815 at step 808. At step 810, the faceted structure provider 816 uses the faceted structure analysis system 35 to analyze the returned faceted structure 819. At step 811, signature information of the returned faceted structure 819 and token ID 820 are communicated across network 822 to the remote validation system 821. At step 812, remote validation system 821 compares the signature information with prior stored signature information. Remote validation system 821 also confirms that any matched signature information also is associated with the same token ID 820. The result of the comparison is communicated as a validation result at step 813 from the remote validation system 821 to the faceted structure analysis system 35 over network 822. At step 814 validation result notification 814 is generated and supplied to the faceted structure provider 816.

Figure 43:
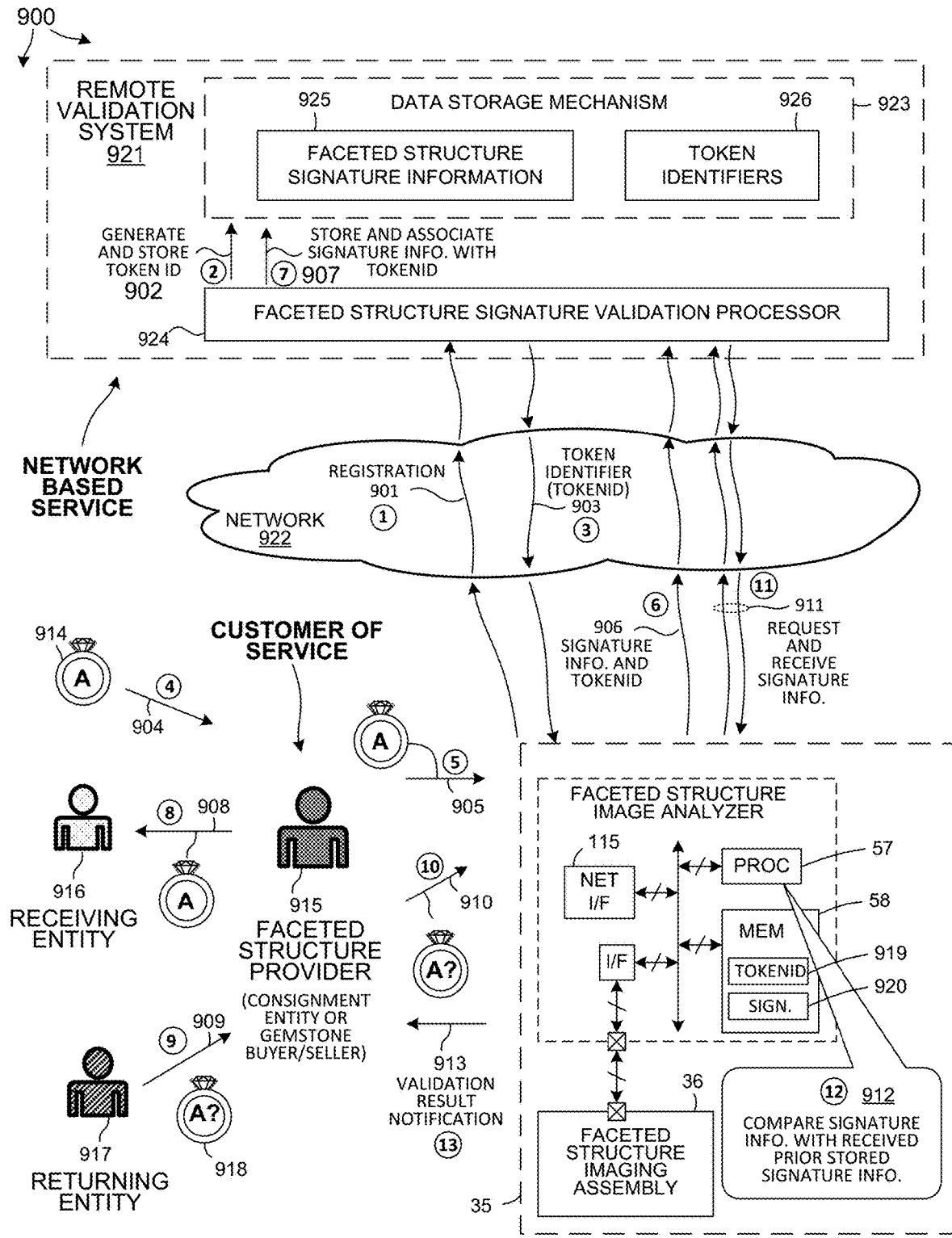
FIG. 43 is a diagram that shows one embodiment of a method 900 of local validation with external signature information that is shown in method 600 of FIG. 40.

FIG. 43 is a diagram that shows one embodiment of a method 900 of local validation with external signature information that is shown in method 600 of FIG. 40. At step 901, the faceted structure provider 915 registers with remote validation system 921. Remote validation system 921 is a network-based service. Faceted structure provider 915 is a customer of the network-based service provided by the remote validation system 921. Remote validation system 921 includes a data storage mechanism 923 and the faceted structure signature validation processor 924. It is understood that the data storage mechanism 923 and the faceted structure signature validation processor 924 may operate on a single server, may be distributed across multiple servers, or may be realized in a serverless architecture.

After registration, remote validation system 921 generates and stores a token identifier at step 902. The token identifier is used to uniquely identify faceted structure provider 915. At step 903, the remote validation system 921 communicates token identifier across network 922 to the faceted structure analysis system 35. The token identifier 919 is stored in the memory 58.

At step 904, faceted structure 914 is received by the faceted structure provider 915. At step 905, faceted structure provider 915 uses the faceted structure analysis system 35 to analyze faceted structure 914. Signature information is obtained using the faceted structure imaging assembly 36. At step 906, the signature information in the token ID 919 communicated to the remote validation system 921 over network 922. At step 907, remote validation system processor 924 stores the received signature information along with the associated token ID 919 of the faceted structure provider 915. Signature information that is generated and provided to remote validation system 921 does not need to be stored in the memory 58. At step 908, the faceted structure 914 is provided to a receiving entity 916.

At some later point in time, at step 909, a returning entity 917 attempts to return faceted structure 918 to the faceted structure provider 915. The faceted structure provider 915 must determine whether or not the return faceted structure 918 is the same as the initial faceted structure 914 that was provided to the receiving entity 916 at step 908. At step 910, the faceted structure provider 915 decides to analyze faceted structure 918 using faceted structure analysis system 35. At step 911, the faceted structure analysis system 35 requests signature information stored by the remote validation system 921. Remote validation system 921 responds to the request by supplying all signature information associated with token ID 919 to the faceted structure analysis system 35 over network 922. The prior stored and obtained signature information is stored in memory 58 indicated by reference numeral 920. At step 912, processor 57 compares the signature information of the returned faceted structure 918 to prior stored signature information a 920 that is received from the remote validation system 921. At step 913, validation result notification is generated and output by the faceted structure analysis system 35.

Figure 44:
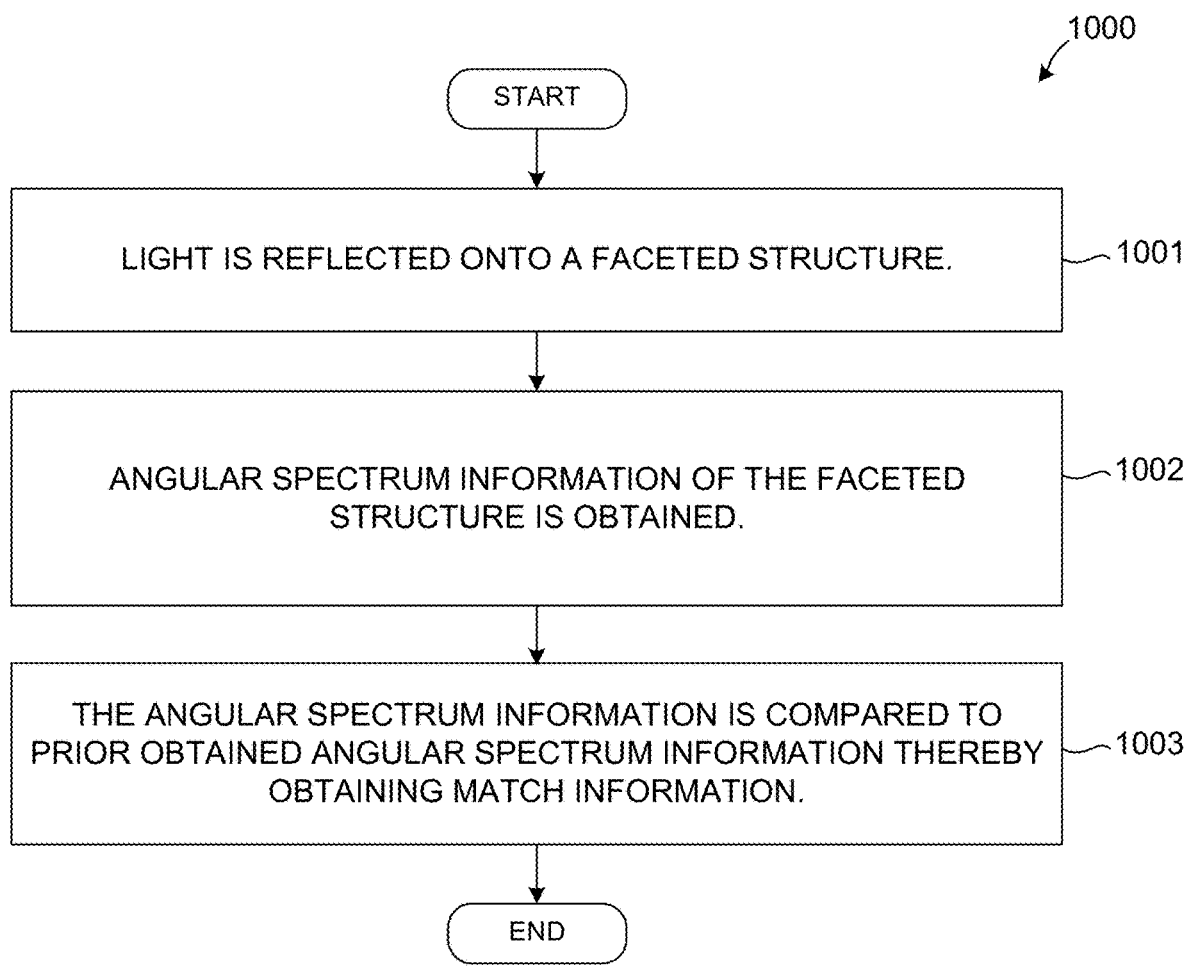
FIG. 44 is a flowchart of a method 1000 in accordance with another novel aspect.

FIG. 44 is a flowchart of a method 1000 in accordance with another novel aspect. In a first step (step 1001), light is reflected onto a faceted structure. In the example of FIG. 18, angular spectrum information of the faceted structure 11 is obtained. In the example of FIG. 18, diffused white light is output by light source 40, reflected onto inner surface 54 of cylinder 50, and colored light is reflected onto the faceted structure 11.

In a second step (step 1002), angular spectrum information of the faceted structure is obtained. In the example of FIG. 18, angular spectrum information of the faceted structure 11 is obtained. The second image 96 comprises angular spectrum information.

In a third step (step 1003), the angular spectrum information is compared to prior obtained angular spectrum information thereby obtaining match information. In the example of FIG. 26, the obtained angular spectrum information 96 is compared to prior obtained angular spectrum information stored in faceted structure signature information 120. In one embodiment, the comparison is performed in accordance with steps 402 and 403 of method 400 of FIG. 36. For example, color bins are determined for angular spectrum information stored in the faceted structure signature information 120. Next, a color bin is generated for the obtained angular spectrum information. Next, a SAD operation is performed between the color bin of the obtained angular spectrum information and each color bin of the angular spectrum information in the faceted structure signature information 120. Next, the SAD values are sorted to obtain match information between the obtained angular spectrum information and the stored angular spectrum information. In other embodiments, a threshold value is stored in memory 58. When the SAD operation value is less than the threshold value, then a match signal is asserted to a digital logic high level indicating that a match is found in the faceted structure signature information 120.

Although certain specific exemplary embodiments are described above in order to illustrate the invention, the invention is not limited to the specific embodiments. For example, the faceted structure 11 shown in the various embodiments is a diamond gemstone, but the faceted structure analysis system 35 is able to analyze other types of gemstones, including white sapphire, white zircon, white topaz, and other clear gemstones. The faceted structure analysis system 35 is able to analyze other types of gemstones, including ruby, emerald, blue sapphire, tanzanite, tourmaline, and other colored gemstones. The density and cut and correction factor for these other types of faceted structures are known by gemologists and can be used by the system 35 to generate weight information.

Although the item 10 has only one faceted structure 11, items having multiple faceted structures are also analyzed by the faceted structure analysis system 35. It is appreciated that the faceted structure analysis system 35 is not limited to operate on only single-gemstone items and items with multiple gemstones are selectively analyzed. The faceted structure analysis system 35 is operable to analyze items with multiple gemstones and to provide weight information for each gemstone. In the case of colored gemstones, 56 color features of the cylinder 50 are selected to provide sufficient contrast to perform analysis on the obtained angular spectrum information. The faceted structure analysis system 35 is also operable to analyze items with multiple gemstones and separately validate each gemstone against prior obtained signature information. In other embodiments, the alignment instrument 43 is automated and adjusts automatically to place the faceted structure in focus with the image sensor 40 and telecentric lens 41. In other embodiments, the cylinder 50 is fixed to the imaging assembly 36 such that the cylinder swaps in and out of place depending on whether the imaging assembly 36 is to operate in the first or second mode. Accordingly, various modifications, adaptations, and combinations of various features of the described embodiments can be practiced without departing from the scope of the invention as set forth in the claims.

What is claimed is:

1. A method comprising:
reflecting light onto a faceted structure in a mounted setting;
obtaining an angular spectrum image of the faceted structure, wherein the angular spectrum image is sensed while the faceted structure is in the mounted setting, and wherein the angular spectrum image is part of signature information that uniquely identifies the faceted structure; and
comparing the angular spectrum image to stored angular spectrum images to validate a source of the faceted structure, wherein the comparing is performed using an image analyzer that analyzes pixels of the angular spectrum image and that analyzes pixels of the stored angular spectrum images, and wherein each of the stored angular spectrum images is part of stored signature information that uniquely identifies a prior analyzed faceted structure.

2. The method of claim 1, wherein the angular spectrum image is obtained using an image sensor, wherein at least one other dimension of the faceted structure is determined using the image sensor, and wherein faceted structure is authenticated by also comparing the at least one other dimension to prior obtained dimensions.

3. The method of claim 1, wherein the reflecting of light onto the faceted structure involves directing light onto color features disposed along an inner surface of a cylinder, wherein the cylinder covers the faceted structure, and wherein at least some light reflected from the color features is reflected by the faceted structure onto a center of the cylinder.

4. The method of claim 3, wherein the color features comprise a first color feature, a second color feature, and a third color feature, wherein each of the first color feature, the second color feature, and the third color feature reflects different color light.

5. The method of claim 4, wherein the first color feature is disposed along the inner surface of the cylinder such that light reflected from the first color feature enters the faceted structure from a first range of angles, wherein the second color feature is disposed along the inner surface of the cylinder such that light reflected from the second color feature enters the faceted structure from a second range of angles, and wherein the third color feature is disposed along the inner surface of the cylinder such that light reflected from the third color feature enters the faceted structure from a third range of angles.

6. The method of claim 1, wherein the comparing of the angular spectrum image to stored angular spectrum images involves comparing color characteristics between images.

7. A system comprising:
a faceted structure imaging assembly, wherein the faceted structure imaging assembly is configured to reflect light onto color features disposed above a faceted structure that is mounted within a setting and to obtain an angular spectrum image of an upper surface of the faceted structure while mounted within the setting, and wherein the light is provided by a light source disposed below the faceted structure in the mounted setting; and
a faceted structure image analyzer, wherein the faceted structure image analyzer is configured to receive the angular spectrum image and compare the angular spectrum image to other stored angular spectrum images via pixel analysis thereby authenticating a source of the faceted structure, wherein the authenticating is performed based in part on the angular spectrum image comparison of the faceted structure image analyzer.

8. The system of claim 7, wherein the authenticating indicates whether an entity provided the faceted structure.

9. The system of claim 7, wherein the faceted structure is selected from the group consisting of: a colorless gemstone, a colored gemstone, a mineral crystal, a faceted cut material, an amorphous structure, and a faceted glass structure.

10. The system of claim 7, wherein the angular spectrum image is obtained while the faceted structure redirects light reflected by the color features disposed above the faceted structure onto an image sensor.

11. The system of claim 7, wherein the faceted structure imaging assembly includes a cylindrical structure having an aperture, and wherein the color features are disposed along an inner surface of the cylindrical structure.

12. The system of claim 7, wherein the color features cause light of varying color to enter the faceted structure, and wherein color indicates a range of angles upon which light enters the faceted structure.

13. The system of claim 7, wherein the faceted structure is part of an item of jewelry.

14. A method comprising:
obtaining signature information of a faceted structure while in a mounted setting, wherein the signature information includes an angular spectrum image of the faceted structure obtained while a colored light pattern is reflected onto the faceted structure, and wherein the colored light pattern is generated in part by a light source disposed below the faceted structure in the mounted setting; and
comparing the signature information of the faceted structure to prior obtained signature information by performing pixel analysis of the angular spectrum image to authenticate a source of the faceted structure.

15. The method of claim 14, wherein the obtaining and the comparing are performed by a faceted structure imaging system.

16. The method of claim 14, wherein the comparing is performed by a remote validation system.

17. The method of claim 14, wherein the angular spectrum image is an Angular Spectrum Evaluation Tool (ASET) image.

18. The method of claim 14, wherein the comparing involves matching images based on color characteristics.

19. The method of claim 1, wherein the faceted structure is part of a jewelry item.

20. The method of claim 14, wherein the faceted structure is part of an item of jewelry.

* * * * *